(12) United States Patent
Wyner et al.

(10) Patent No.: US 9,615,611 B2
(45) Date of Patent: Apr. 11, 2017

(54) BREATHABLE IMPACT ABSORBING CUSHIONING AND CONSTRUCTIONS

(71) Applicant: G-FORM, LLC, Providence, RI (US)

(72) Inventors: Daniel M. Wyner, North Scituate, RI (US); Thomas Cafaro, Foster, RI (US); Richard L. Garrard, Newport, RI (US); Stephanie Thorn, Chepachet, RI (US); Maria E. Macrina, Providence, RI (US)

(73) Assignee: G-Form, LLC, Providence, RI (US)

( * ) Notice: Subject to any disclaimer, the term of this patent is extended or adjusted under 35 U.S.C. 154(b) by 0 days.

(21) Appl. No.: 14/375,091

(22) PCT Filed: Jan. 28, 2013

(86) PCT No.: PCT/US2013/023480
§ 371 (c)(1),
(2) Date: Jul. 28, 2014

(87) PCT Pub. No.: WO2013/116157
PCT Pub. Date: Aug. 8, 2013

(65) Prior Publication Data
US 2015/0082523 A1    Mar. 26, 2015

Related U.S. Application Data

(63) Continuation-in-part of application No. 13/208,229, filed on Aug. 11, 2011.
(Continued)

(51) Int. Cl.
*A41D 13/015* (2006.01)
*A63B 71/08* (2006.01)
(Continued)

(52) U.S. Cl.
CPC ............ *A41D 13/015* (2013.01); *A63B 71/08* (2013.01); *B32B 3/04* (2013.01); *B32B 3/263* (2013.01);
(Continued)

(58) Field of Classification Search
CPC .............. A41D 13/015; A41D 13/0518; A41D 13/065; A41D 1/06; A41D 13/02
(Continued)

(56) References Cited

U.S. PATENT DOCUMENTS 3,772,704 A    11/1973    Carbonneau
3,997,214 A    12/1976    Jacobs
(Continued)

FOREIGN PATENT DOCUMENTS

CA    2120178 A1    3/1994
CN    1250354    4/2000
(Continued)

OTHER PUBLICATIONS

737 McDavid Hex™ Thudd Short™, Retrieved from Internet at http://www.mcdavidusa.com/Product/737/MCDAVID_Short%E2%84%A2.aspx; retrieved on Sep. 18, 2014.
(Continued)

*Primary Examiner* — Tejash Patel
(74) *Attorney, Agent, or Firm* — Michele J. Young

(57) ABSTRACT

Disclosed herein, in one embodiment, is a breathable cushioning pad. The cushioning pad includes an upper layer surface, a lower layer with a lower surface, and a cushioning material disposed between the upper layer and the lo cushioning pad has a thickness. A channel can be disposed in the cushioning pad and defines a cushioning region The channel includes a thickness less than the thickness of the cushioning region. At least one vent extends through connection with the upper surface and the lower surface.

9 Claims, 19 Drawing Sheets

Related U.S. Application Data

(60) Provisional application No. 61/591,902, filed on Jan. 28, 2012.

(51) Int. Cl.

| | |
|---|---|
| *B32B 5/02* | (2006.01) |
| *B32B 5/18* | (2006.01) |
| *B32B 5/22* | (2006.01) |
| *B32B 5/24* | (2006.01) |
| *B32B 27/06* | (2006.01) |
| *B32B 27/40* | (2006.01) |
| *B32B 3/26* | (2006.01) |
| *B32B 3/30* | (2006.01) |
| *B32B 3/04* | (2006.01) |
| *A41D 13/06* | (2006.01) |
| *A63B 71/12* | (2006.01) |
| *A41D 31/00* | (2006.01) |

(52) U.S. Cl.
CPC .............. *B32B 3/30* (2013.01); *B32B 5/02* (2013.01); *B32B 5/18* (2013.01); *B32B 5/22* (2013.01); *B32B 5/24* (2013.01); *B32B 5/245* (2013.01); *B32B 27/065* (2013.01); *B32B 27/40* (2013.01); *A41D 13/065* (2013.01); *A41D 31/0044* (2013.01); *A41D 2400/20* (2013.01); *A41D 2600/10* (2013.01); *A63B 2071/1208* (2013.01); *B32B 2266/0278* (2013.01); *B32B 2266/06* (2013.01); *B32B 2307/558* (2013.01); *B32B 2437/00* (2013.01); *B32B 2571/00* (2013.01)

(58) Field of Classification Search
USPC ................ 2/455, 267, 24, 227, 79
See application file for complete search history.

(56) References Cited

U.S. PATENT DOCUMENTS

| | | |
|---|---|---|
| 4,306,315 A | 12/1981 | Castiglia |
| 4,397,636 A | 8/1983 | Ganshaw |
| 4,471,538 A | 9/1984 | Pomeranz et al. |
| 4,481,679 A | 11/1984 | Hayes |
| 4,602,384 A | 7/1986 | Schneider |
| 4,700,407 A | 10/1987 | Mattila |
| 4,751,748 A | 6/1988 | Ekins |
| 4,989,266 A | 2/1991 | Borgese et al. |
| 5,052,053 A | 10/1991 | Peart et al. |
| 5,168,576 A * | 12/1992 | Krent et al. ............ 2/456 |
| 5,423,087 A | 6/1995 | Krent et al. |
| D360,285 S | 7/1995 | Paffett et al. |
| 5,443,883 A | 8/1995 | Park |
| 5,477,558 A | 12/1995 | Volker et al. |
| 5,477,559 A | 12/1995 | Clement |
| 5,551,082 A | 9/1996 | Stewart et al. |
| 5,611,080 A | 3/1997 | Skottheim |
| 5,619,748 A | 4/1997 | Nelson et al. |
| 5,640,714 A | 6/1997 | Tanaka |
| 5,689,836 A * | 11/1997 | Fee et al. ............ 2/465 |
| 5,724,670 A | 3/1998 | Price |
| 5,789,327 A | 8/1998 | Rousseau |
| 5,796,028 A | 8/1998 | Field et al. |
| 5,926,842 A | 7/1999 | Price et al. |
| 6,000,055 A | 12/1999 | Citterio |
| 6,079,056 A | 6/2000 | Fogelberg |
| 6,093,468 A | 7/2000 | Toms et al. |
| 6,103,641 A | 8/2000 | Gehring, Jr. |
| 6,131,734 A | 10/2000 | Hollingsworth et al. |
| 6,151,710 A | 11/2000 | Bachner, Jr. |
| 6,219,842 B1 | 4/2001 | Bachner, Jr. |
| 6,279,160 B1 | 8/2001 | Chen |
| 6,289,524 B1 | 9/2001 | Wright et al. |
| 6,295,654 B1 * | 10/2001 | Farrell ............ 2/456 |
| D463,886 S | 10/2002 | Cantu, Jr. |
| D472,678 S | 4/2003 | Cho |
| 6,547,327 B1 * | 4/2003 | Yates ............ 297/214 |
| 6,560,781 B1 | 5/2003 | Keene et al. |
| 6,701,529 B1 | 3/2004 | Rhoades et al. |
| 6,786,126 B2 | 9/2004 | Sargent |
| D505,534 S | 5/2005 | Matechen |
| 6,912,729 B2 | 7/2005 | Nishimoto |
| 6,959,453 B2 | 11/2005 | Best |
| 7,000,259 B2 | 2/2006 | Matechen |
| 7,010,811 B1 | 3/2006 | Park |
| D518,623 S | 4/2006 | Matechen |
| 7,100,216 B2 | 9/2006 | Matechen et al. |
| 7,114,189 B1 | 10/2006 | Kleinert |
| 7,300,893 B2 | 11/2007 | Barsoum et al. |
| 7,381,460 B2 | 6/2008 | Palmer et al. |
| D572,430 S | 7/2008 | Wong |
| D582,608 S | 12/2008 | Palmer |
| 7,498,276 B2 | 3/2009 | Wagner et al. |
| 7,500,274 B1 | 3/2009 | Kallen |
| D593,258 S | 5/2009 | Kamradt |
| 7,601,654 B2 | 10/2009 | Bhatnagar et al. |
| 7,622,405 B1 | 11/2009 | Arvidson et al. |
| 7,637,884 B2 | 12/2009 | Nordt, III et al. |
| 7,708,708 B2 | 5/2010 | Nordt, III et al. |
| 7,757,307 B2 | 7/2010 | Wong |
| 7,757,310 B2 | 7/2010 | Wong |
| 7,794,827 B2 | 9/2010 | Palmer et al. |
| D626,718 S | 11/2010 | Turner |
| D626,719 S | 11/2010 | Turner |
| 7,841,019 B2 | 11/2010 | Godshaw et al. |
| D628,769 S | 12/2010 | Turner |
| D630,385 S | 1/2011 | Bishop |
| 7,874,239 B2 | 1/2011 | Howland |
| 7,891,026 B1 * | 2/2011 | Smith ............ 2/465 |
| D633,279 S | 3/2011 | Turkbas |
| D633,688 S | 3/2011 | Turner |
| 7,917,971 B2 | 4/2011 | Kamradt |
| 7,958,812 B2 | 6/2011 | Wang et al. |
| 8,015,617 B1 | 9/2011 | Carbajal et al. |
| 8,108,951 B2 | 2/2012 | Gabry et al. |
| 8,124,548 B2 | 2/2012 | Ardiff et al. |
| D656,278 S | 3/2012 | Saranga |
| D656,685 S | 3/2012 | Best et al. |
| 8,129,293 B2 | 3/2012 | Budden et al. |
| 8,151,376 B2 | 4/2012 | Onrot et al. |
| D663,072 S | 7/2012 | Best et al. |
| D663,101 S | 7/2012 | Best et al. |
| D663,102 S | 7/2012 | Hogg |
| D663,484 S | 7/2012 | Best et al. |
| D663,485 S | 7/2012 | Turkbas et al. |
| D663,486 S | 7/2012 | Turkbas et al. |
| D665,949 S | 8/2012 | Jourde |
| 8,336,120 B2 | 12/2012 | Wong |
| 8,387,170 B2 | 3/2013 | Green et al. |
| D684,323 S | 6/2013 | Macrina et al. |
| 8,499,987 B2 | 8/2013 | Fidrych et al. |
| D693,064 S | 11/2013 | Dupree et al. |
| 8,672,864 B2 | 3/2014 | Nordt, III et al. |
| 8,726,424 B2 | 5/2014 | Thomas et al. |
| 8,732,869 B2 | 5/2014 | Onrot et al. |
| 9,254,433 B2 | 2/2016 | Dodd |
| 2001/0052146 A1 | 12/2001 | Garneau |
| 2002/0092199 A1 | 7/2002 | Fish et al. |
| 2003/0188373 A1 | 10/2003 | Garneau |
| 2004/0161989 A1 | 8/2004 | Dennis et al. |
| 2005/0034330 A1 | 2/2005 | Baychar |
| 2005/0210570 A1 | 9/2005 | Garneau |
| 2005/0234380 A1 | 10/2005 | Fulford et al. |
| 2006/0228538 A1 | 10/2006 | Baychar |
| 2006/0230488 A1 | 10/2006 | Rudolph |
| 2006/0277801 A1 | 12/2006 | Schwarze et al. |
| 2007/0174953 A1 | 8/2007 | Garneau |
| 2008/0072359 A1 | 3/2008 | Godshaw et al. |
| 2008/0166524 A1 | 7/2008 | Skaja et al. |
| 2009/0039688 A1 | 2/2009 | Wyner et al. |
| 2009/0077707 A1 | 3/2009 | Scheffer |
| 2009/0119817 A1 | 5/2009 | Sonner |
| 2009/0126066 A1 | 5/2009 | Sasaki |

(56) References Cited

U.S. PATENT DOCUMENTS

| | | |
|---|---|---|
| 2009/0162651 A1 | 6/2009 | Rios et al. |
| 2009/0186189 A1 | 7/2009 | White et al. |
| 2009/0255625 A1 | 10/2009 | Fox et al. |
| 2009/0324927 A1 | 12/2009 | Palmer et al. |
| 2010/0095433 A1 | 4/2010 | Turkbas |
| 2010/0132099 A1 | 6/2010 | Green et al. |
| 2010/0269237 A1 | 10/2010 | Ben-Zicron |
| 2010/0275350 A1 | 11/2010 | Wong |
| 2010/0275351 A1 | 11/2010 | Wong |
| 2010/0306908 A1 | 12/2010 | Fiegener et al. |
| 2011/0061154 A1 | 3/2011 | Turner et al. |
| 2011/0167529 A1 | 7/2011 | Anderson et al. |
| 2011/0167548 A1 | 7/2011 | Jourde et al. |
| 2011/0180744 A1 | 7/2011 | Haggquist |
| 2011/0233973 A1 | 9/2011 | Wyner et al. |
| 2011/0252549 A1 | 10/2011 | Jourde et al. |
| 2011/0283432 A1 | 11/2011 | Best et al. |
| 2011/0289663 A1 | 12/2011 | Kamradt |
| 2011/0307999 A1 | 12/2011 | Jourde et al. |
| 2012/0011656 A1 | 1/2012 | Daly |
| 2012/0084896 A1 | 4/2012 | Wyner et al. |
| 2012/0102613 A1 | 5/2012 | Loth et al. |
| 2012/0111343 A1 | 5/2012 | Turkbas et al. |
| 2012/0174748 A1 | 7/2012 | Landi |
| 2012/0180181 A1 | 7/2012 | Best et al. |
| 2013/0061377 A1 | 3/2013 | Wyner et al. |
| 2013/0185839 A1 | 7/2013 | Storelli et al. |
| 2013/0244526 A1 | 9/2013 | Wyner et al. |
| 2013/0269075 A1 | 10/2013 | Boye |
| 2014/0331387 A1 | 11/2014 | Hennings et al. |
| 2015/0082523 A1 | 3/2015 | Wyner et al. |
| 2015/0296899 A1 | 10/2015 | Wyner et al. |

FOREIGN PATENT DOCUMENTS

| | | |
|---|---|---|
| CN | 2487255 Y | 4/2002 |
| CN | 201088697 Y | 7/2008 |
| CN | 202027317 U | 11/2011 |
| DE | 8524366 | 4/1989 |
| DE | 9110695 | 3/1992 |
| DE | 9412960 | 10/1994 |
| DE | 9218532 | 2/1995 |
| DE | 202011109220 | 3/2012 |
| DE | 202013100788 | 5/2013 |
| DE | 20315786 | 3/2014 |
| DE | 202014006528 | 10/2014 |
| EP | 0846425 | 6/1998 |
| EP | 0872190 | 10/1998 |
| EP | 1369149 | 12/2003 |
| EP | 1550836 | 7/2005 |
| EP | 1847796 | 10/2007 |
| EP | 2014702 | 1/2010 |
| EP | 2439480 | 4/2012 |
| EP | 2229828 | 5/2012 |
| FR | 2815519 | 4/2002 |
| GB | 1556245 | 11/1979 |
| GB | 2246282 | 1/1992 |
| JP | H6-504689 | 4/1992 |
| JP | 6-158834 | 6/1994 |
| TW | 391293 | 5/2000 |
| TW | M361240 | 7/2009 |
| WO | WO9302332 | 2/1993 |
| WO | WO9733493 | 9/1997 |
| WO | WO9841118 | 9/1998 |
| WO | WO2004089132 | 10/2004 |
| WO | WO2010044849 | 4/2010 |
| WO | WO2010106103 | 9/2010 |
| WO | WO2010110804 | 9/2010 |
| WO | WO2010140177 | 12/2010 |
| WO | WO2011082201 | 7/2011 |
| WO | WO2012021737 | 2/2012 |
| WO | WO2013040488 | 3/2013 |
| WO | WO2013142523 | 9/2013 |
| WO | WO2015167877 | 11/2015 |

OTHER PUBLICATIONS

Nike Pro Combat Padded Shorts; Fighter Fashion.com; Retrieved from http://web.archive.org.web/20130828115103/http:fighterxfashion.com/nike-pro-combatpadded-shorts on Sep. 18, 2014.

MMA Gear Guide; Shock Doctor MMA Padded Compression Shorts; Retrieved from http://www.mmagearguide.com/shock-doctor-mma-padded-compressionshorts/; on Sep. 24, 2014.

Martial Art Supplies; "Shock Doctor Ultra MMA Padded Shorts"; retrieved from http://www.martialartssupermarket.com/; on Sep. 18, 2014.

Rogers Corporation; "Shaping Up Your Impact Protection" Publication #15C-073.

International Search Report in International Application No. PCT/US2015/026961 mailed Jul. 10, 2015.

International Search Report in International Application No. PCT/US2013/033016 mailed Jun. 17, 2013.

International Search Report in International Application No. PCT/US2012/055617 mailed Dec. 11, 2012.

Office Action in U.S. Appl. No. 13/618,610 mailed Mar. 23, 2016.
Office Action in U.S. Appl. No. 13/618,610 mailed Jul. 1, 2015.
Office Action in U.S. Appl. No. 13/618,610 mailed Oct. 16, 2014.
Office Action in U.S. Appl. No. 13/847,422 mailed Oct. 8, 2014.
Office Action in U.S. Appl. No. 13/847,422 mailed Aug. 31, 2015.
Office Action in U.S. Appl. No. 13/847,422 mailed Apr. 18, 2016.
Office Action in U.S. Appl. No. 13/208,229 mailed Nov. 4, 2014.
Office Action in U.S. Appl. No. 13/208,229 mailed Aug. 11, 2015.
Office Action in U.S. Appl. No. 13/208,229 mailed Mar. 15, 2016.
Office Action in U.S. Appl. No. 13/208,229 mailed Oct. 3, 2016.

* cited by examiner

Table A:
Padding Dimensions

| Embodiments | Dimension | Exemplary Range (inches) | |
|---|---|---|---|
| | | Min | Max |
| 100, 200, 300 | Medallion Length/Width | 0.5" | 9.0" |
| | Medallion Thickness | 0.03" | 0.875" |
| | Medallion Spacing (i.e., gap) | 0.05" | 1.0" |
| | Central Vent Diameter | .0626" | 1.0" |
| 60, 70, 80, 80' | Groove Width (42) | 0.05" | 0.5" |
| | Groove Depth (42) | 0.05" | 0.5" |
| 200, 300 | Hinge Vent Siameters | 0.0625" | 0.5" |
| | Hinge Vent Spacing from Medallion Edge | 0.01" | 0.25" |
| 300 | Hinge Length | 0.125" | 1.0" |

FIG. 27

BREATHABLE IMPACT ABSORBING CUSHIONING AND CONSTRUCTIONS

CROSS-REFERENCE TO RELATED APPLICATIONS

The present application is a continuation-in-part of commonly-owned and co-pending application Ser. No. 13/208,229, which was filed on Aug. 11, 2011, and claims the benefit of U.S. Provisional Application No. 61/591,902, which was filed on Jan. 28, 2012, both of which are incorporated herein by reference in their entirety.

TECHNICAL FIELD

The disclosure relates to breathable and conformable protection pads, articles that include such pads, methods of making and using the pads and articles and, in particular, to breathable and conformable protection pads for humans, for areas that require free range of motion.

BACKGROUND

Many activities, especially athletic activities, involve potential risk to the body from impact. Elbows, knees, shoulders, ankles, hips and other joints can be especially susceptible to impact damage and yet are challenging to protect without restricting the range of motion and movement of the individual. Impact protection can be heavy, non-breathable or restrictive, or alternatively does not target certain body parts accurately, or does so inconsistently.

Some impact protection systems consist of separate rigid pads that are heavy, and restrict motion. The rigid components can be lined with some form of soft cushioning to make them comfortable against the body, which is an attempt to cushion impacts to the body, but the extra layers add to the weight and discomfort of the pads. In addition, the padding systems can be hot to wear, and also restrict the evaporation of moisture and sweat.

Other protective pads are made from materials that are softer, so they bend, but offer little in the way of protection against a serious impact, especially an impact from a rock or other hard object. These materials include standard chemically foamed polyether or polyester foams.

Other padding can be made from stiffer foam materials, such as cross-linked polyethylene foams or EVA foams. Such foams offer a bit more protection, but restrict the user's range of motion. Overall, such materials offer insufficient protection, while restricting motion.

There also have been attempts to use stiffer foams as pads, but the foam had to be cut in strips in order to reduce the restriction of movement that a solid foam piece would cause. Unfortunately for the wearer, the strips offered less than optimal protection.

Foam can also be thermoformed into curved or complex shapes, and sewn between layers of material that holds the strips or pieces in place. Other materials that offer better impact absorption such as d30 have also been used in padding, but these materials are also stiff.

Attempts have been made to make the foregoing materials appear less stiff to the wearer by creating thinner regions in each piece which allows better flexing. But protective pads manufactured this way cannot offer full range of motion at the location of the padding, because the material breaks apart when flexed at the thinner areas. These materials also need to be buried beneath layers of fabric because they are not durable or aesthetically pleasing enough to be exposed. The use of covering materials adds unnecessary weight to the padding, and increases the cost of the pads.

A need exists for improved breathable, protective padding, particularly for areas requiring range of motion, and for joints.

SUMMARY

Disclosed herein, in one embodiment, is a breathable cushioning pad. The cushioning pad includes an upper layer with an upper surface, a lower layer with a lower surface, and a cushioning material disposed between the upper layer and the lower layer. The cushioning pad has a thickness. A channel can be disposed in the cushioning pad and defines a cushioning region having a thickness. The channel includes a thickness less than the thickness of the cushioning region. At least one vent extends through and is in fluid connection with the upper surface and the lower surface.

In another embodiment, the breathable cushioning pad includes a groove defined in the upper surface of the cushioning region. The groove has a thickness less than the thickness of the cushioning region and greater than the thickness of the channel.

In another embodiment, the breathable cushioning pad includes a flange, and a channel adjacent to the flange. The channel has a thickness greater than the thickness of the channel and less than the thickness of the cushioning region.

In another embodiment, the breathable cushioning pad includes at least one vent extending through and in fluid connection with the upper surface and the lower surface of the pad. In another embodiment, the breathable cushioning pad includes a vent disposed in the channel.

In another embodiment, the breathable cushioning pad includes Disclosed herein, in one embodiment, is a breathable cushioning pad, comprising a cushioning region comprising an upper surface, a lower surface, a thickness and a width. The cushioning region comprises a cushioning material disposed between and continuously bonded to a continuous upper layer and a continuous lower layer. A channel is disposed around and defines the cushioning region. The channel comprises a thickness less than the thickness of the cushioning region. The channel further includes the continuous upper layer and the continuous lower layer, and the continuous upper layer is at least partially bonded to the continuous lower layer. At least one vent extends through and is in fluid connection with the upper surface and the lower surface.

In another embodiment, the breathable cushioning pad may include at least one vent extending through and in fluid connection with the upper surface and the lower surface of the channel.

In another embodiment, the breathable cushioning pad may include a groove defined in the upper surface of the cushioning region, and the groove may have a thickness less than the thickness of the cushioning region and greater than the thickness of the channel.

In another embodiment, the breathable cushioning pad may include a perimeter flange and a perimeter channel. The perimeter flange can be spaced apart from the cushioning region by the width of the perimeter channel. The perimeter flange can have a thickness greater than the thickness of the perimeter channel and less than the thickness of the cushioning region. In another embodiment, the perimeter channel may include at least one vent extending through and in fluid connection with the upper surface and the lower surface of the perimeter channel.

In any of the embodiments of the cushioning pad, the continuous upper and lower layers can comprise a polyester thermoplastic polyurethane.

In any of the embodiments of the cushioning pad, the upper and lower layers can comprise a TPE film bonded to a layer spandex fabric, such that the TPE layers are disposed adjacent to the cushioning material.

In any of the embodiments of the cushioning pad, the cushioning material can comprise a cellular material comprising a plurality of cells having a minimum cell diameter, and the thickness of the cushioning material between the inner layer and the outer layer is less than the minimum cell diameter.

BRIEF DESCRIPTION OF THE DRAWINGS

The foregoing and other features and advantages will be apparent from the following more particular description of exemplary embodiments of the disclosure, as illustrated in the accompanying drawings, in which like reference characters refer to the same parts throughout the different views. The drawings are not necessarily to scale, emphasis instead being placed upon illustrating the principles of the disclosure.

FIG. 27 is a table listing exemplary ranges for various dimensions of the pads according to the present disclosure.

DETAILED DESCRIPTION OF EXEMPLARY EMBODIMENTS

Figure 1:
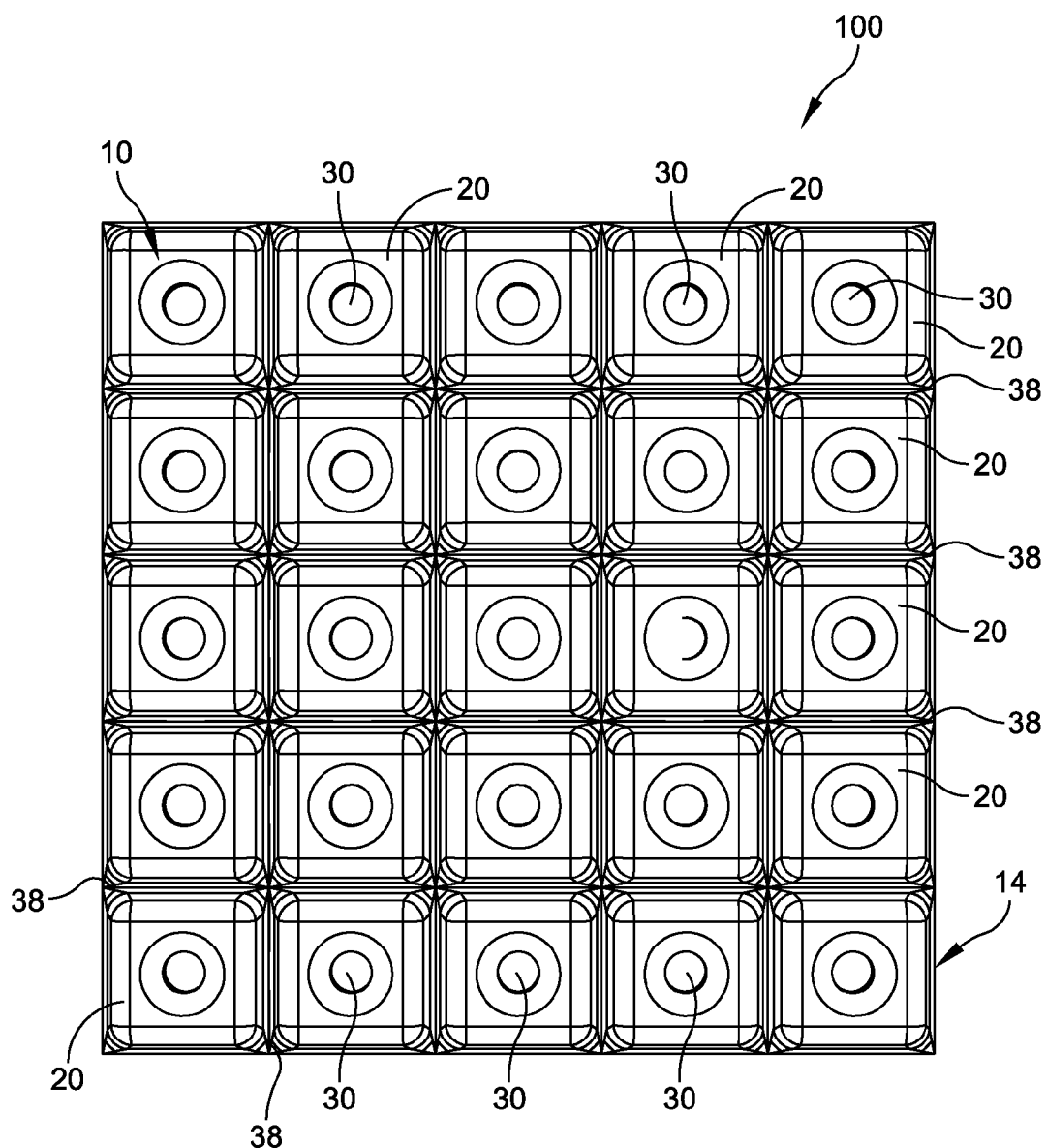
FIG. 1 is a top view of a section of one embodiment of a cushioning pad according to the present disclosure, including a plurality of square cushioning medallions.
Figure 2:
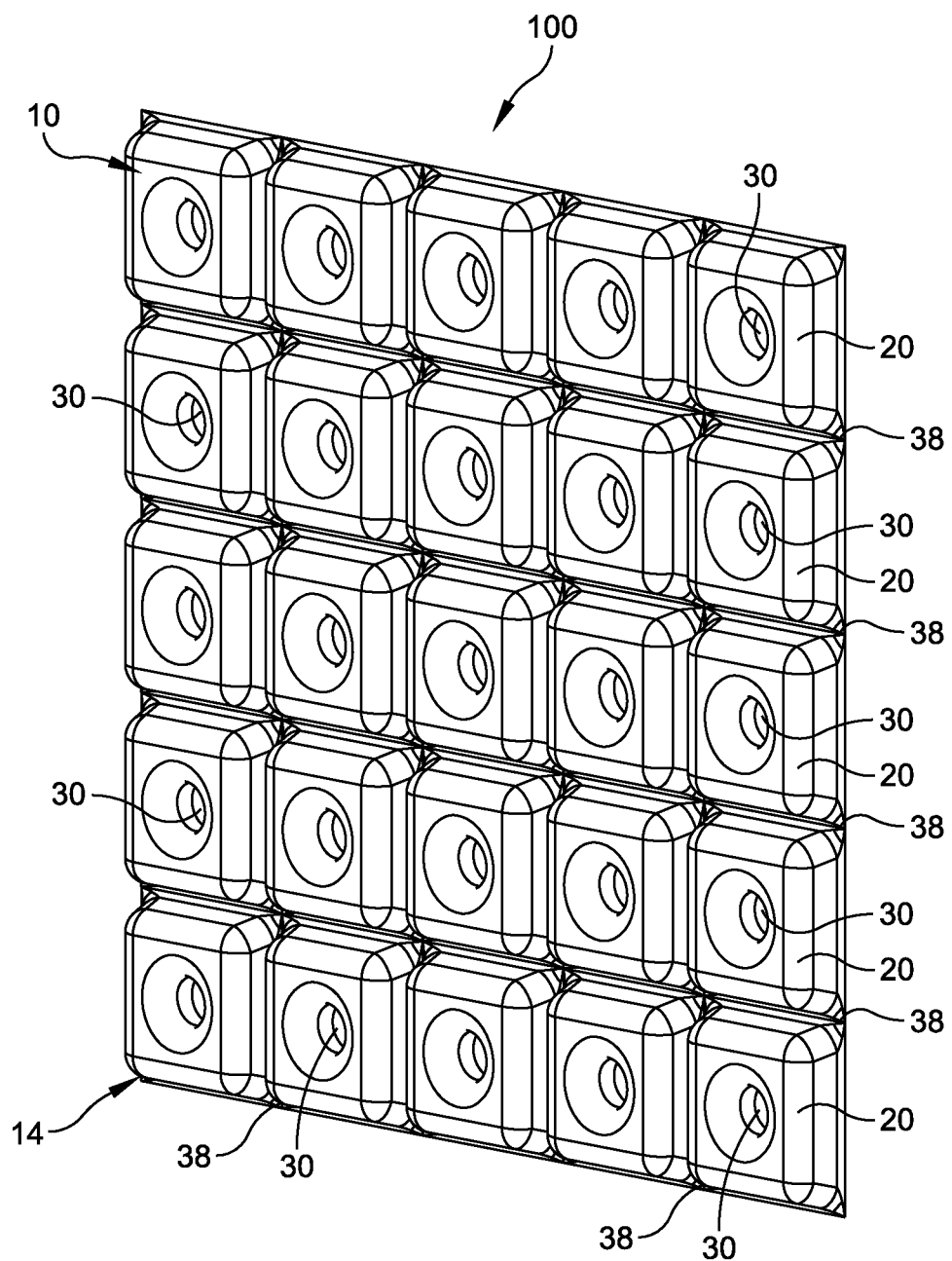
FIG. 2 is a perspective view of the cushioning pad section shown in FIG. 1.
Figure 3:
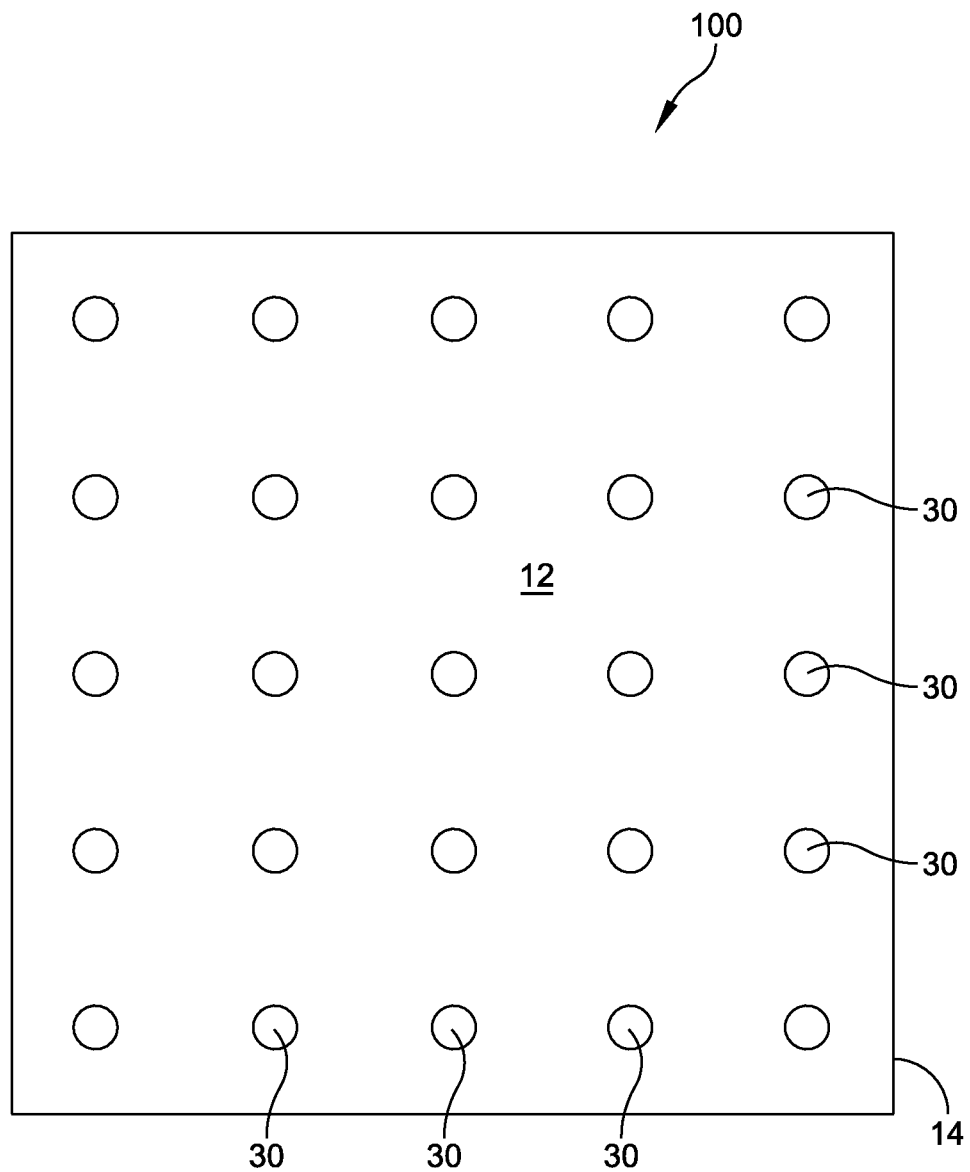
FIG. 3 is a bottom view of the cushioning pad section shown in FIG. 1.
Figure 4:
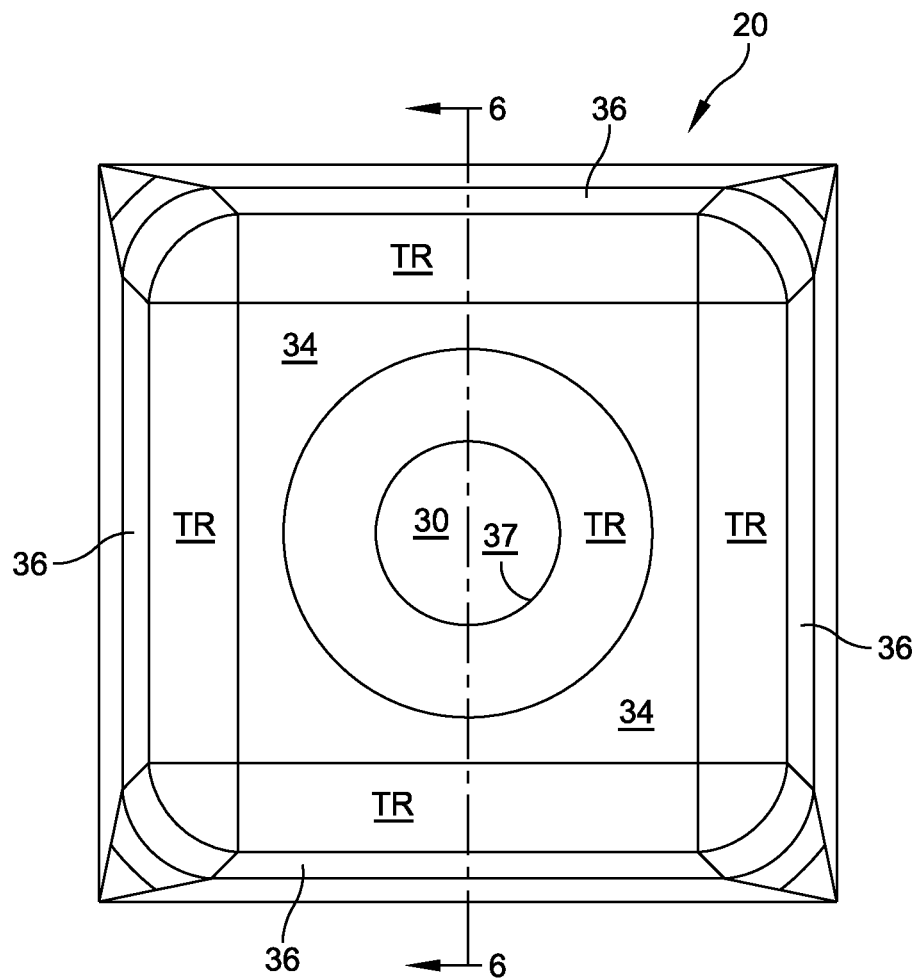
FIG. 4 is a top view of one of the square cushioning medallions forming part of the cushioning pad shown in FIG. 1, showing a centrally located "vent"
Figure 5:
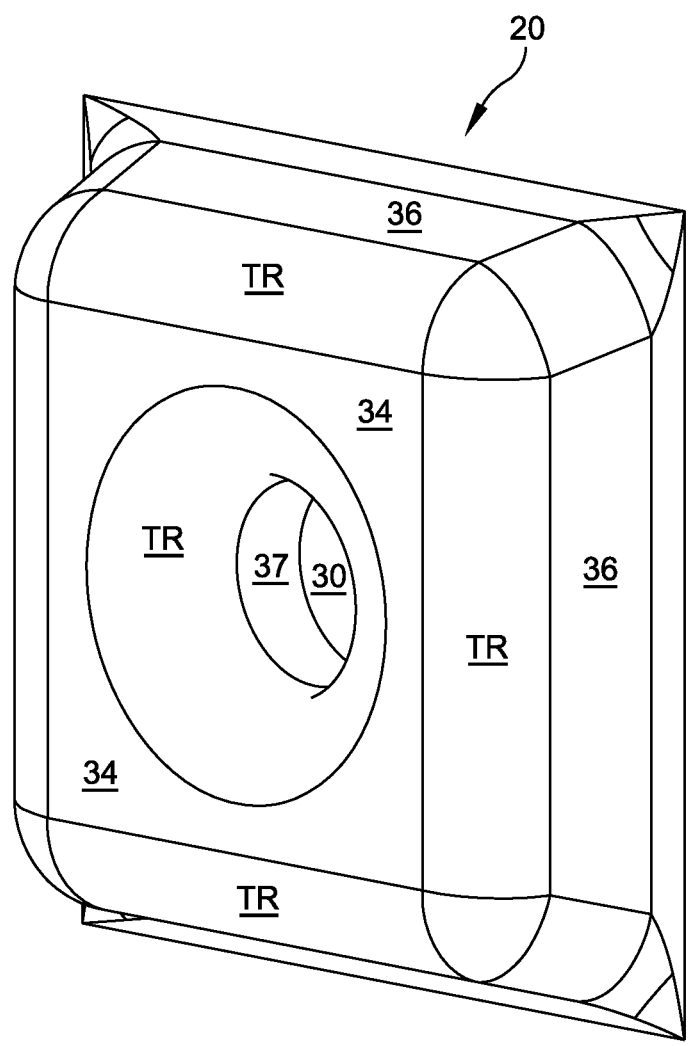
FIG. 5 is a perspective view of the square cushioning medallion shown in FIG. 4.

The present disclosure is directed to a breathable and conforming protective cushioning pad, to items comprising the pads, and to methods of making and using the pads.

The present pads include cushioning regions of various shapes, sizes, configurations and thicknesses. For ease of discussion, the terms "cushioning region" and "medallion" will used interchangeably throughout the description. Various materials can be used for the medallions, as will be described below. The medallions are spaced apart by channels of various depths and configurations, which define the perimeter of the medallions, and function as flexible "hinges". The present pads can comprise at least one vent disposed in one or more of the medallions, one or more of the channels, or in one or more of both of the medallions and channels. The vents can various shapes, sizes, configurations and thicknesses. The vents allow airflow to and from opposite sides of the pad, which provides breathable characteristics to the pads, and to garments that comprise the pads, as well as reducing the weight of the pads. Therefore, such garments allow body moisture and vapors to be released, so they can be used for activewear without overheating or feeling discomfort.

The surface of the medallions also may include channels and/or grooves of various depths and configurations, which define, in part, the contours of the medallions, and provide some ventilation. In some instances, a perimeter flange may be provided, spaced apart from the perimeter of the pad.

The combination of the medallions, vents, channels, grooves and flange, as well as the materials from which the pads are formed, together provide various functional characteristics to the pad. For example, the channels are deeper than the grooves, and are configured to provide unrestricted, free range of motion in critical areas, such as around joints. The grooves are shallower than the hinges, and provide flexibility, while retaining some cushioning and/or impact resistance. However, it should be understood that both the channels and the grooves function as "hinges," which increase the articulation of the pad.

The present cushioning pads can be incorporated into clothing, and can be designed to have specific functional characteristics. Such clothing is unique in its ability to provide protection to areas of the body that flex, particularly joints. The padding can be incorporated into garments in a unique way, such that garment materials fit snugly, but stretch and conform to the body, or to a specific joint shape, resulting in an integrated padding system that protects the wearer from impact better than other products, because the pad is in constant and close, or direct, contact with the wearer during the full range of motion. Garments incorporating the present pads provide improved protection from injury when worn, because the base of the pad, or the material to which the base of the pad is attached, can be maintained in direct contact with the user's body during use, when incorporated into clothing that stretches and fits snugly, such as compression clothing. The flexibility of the pads allows the pads to conform to a user's body shape, so that the pad can be maintained in contact with the user's body. That is, without the degree of flexibility of the present pads, the pads would not be capable of conforming to the changing body contours of the user, while in motion. For ease of discussion, the term "flexible," as used herein, means the ability of the pad to move by bending, twisting, flexing and/or stretching, and the like.

By combining specific shapes, sizes, configurations, contours and orientations of the medallions, hinges, grooves and/or a perimeter flange, with specific pad and clothing materials, garments can be designed to maximize a user's free range of motion, while protecting specific, targeted areas of the body, particularly joints. Such garments are aesthetically pleasing, more durable, lower in cost, more breathable and comfortable, and provide significant range of motion and targeted, accurate, protection to the body.

Similarly, the present cushioning pads can be incorporated into other items, such as protective cases. For example, the padding can be incorporated into sleeves or cases that correspond to the shape and size of an electronic device, such as a laptop computer or a media device, such that they fit snugly, but also stretch and conform to the exterior of the case. Cases comprising the present pads can provide lightweight, flexible and impact-resistant protection, and move heat away from the device contained in the case.

In one exemplary embodiment comprising a continuously bonded multi-layer construction, the present pads and items including such pads provide items that are rugged, durable, and able to withstand the temperatures, detergents and mechanical action used in industrial and/or commercial laundering, unlike other padded clothing, which tends to degrade under such harsh conditions. The presence of the continuous bond between the layers in the hinges is advantageous because it "locks" the medallions in place, minimizing or preventing the egress of cushioning material from the pad or, alternatively, minimizing or preventing the ingress of materials, such as fluids, into the pads. Therefore, the hinges stabilize the pads, particularly the cushioning material, such that fluids and other materials are not able to penetrate the pad, which might otherwise lead to delamination. The presence of the vents, which are also continuously bonded, maximizes the breathability and ventilating ability of the pads, without compromising the durability and washability of the pads.

FIGS. 1-6, when taken together, illustrate a section 100 of cushioning material according to the present disclosure. For ease of discussion, section 100 will be referred to hereinafter as "pad 100". As shown, pad 100 comprises a front surface 10, a back surface 12 and a perimeter 14. Pad 100 further comprises a plurality of cushioning regions 20, spaced apart and interconnected by a plurality of channels 38, and at least one vent 30 disposed in the center each of the medallions 20.

For ease of discussion throughout the description, the "cushioning region(s)" will be referred to hereinafter as medallion(s). Although illustrated with a plurality of medallions, it should be understood that the pad can comprise a single medallion, with at least one vent. Similarly, although illustrated with a vent in each of the plurality of medallions, it should be understood that it is not necessary for each medallion to comprise a vent. In the present embodiment, the pad 100 and the cushioning region 20 are square, but it should be recognized that the pad 100 and the cushioning region 20 can comprise any shape, size or configuration as is practical or desired for a particular design or application. The size, shape, thickness and material composition of the pads, medallions and vents may be varied, depending on a number of factors including, but not limited to, desired amount of flexibility for the pad, the desired amount of impact resistance, the desired amount of breathability, etc. In addition, the configuration of the medallions may be varied, and more than one type of medallion shape or vent shape may be used in the pads.

Figure 6:
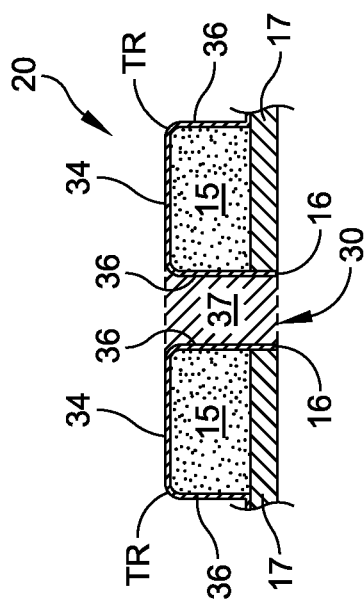
FIG. 6 is a cross-section of the square cushioning medallion shown in FIG. 4.
Figure 7:
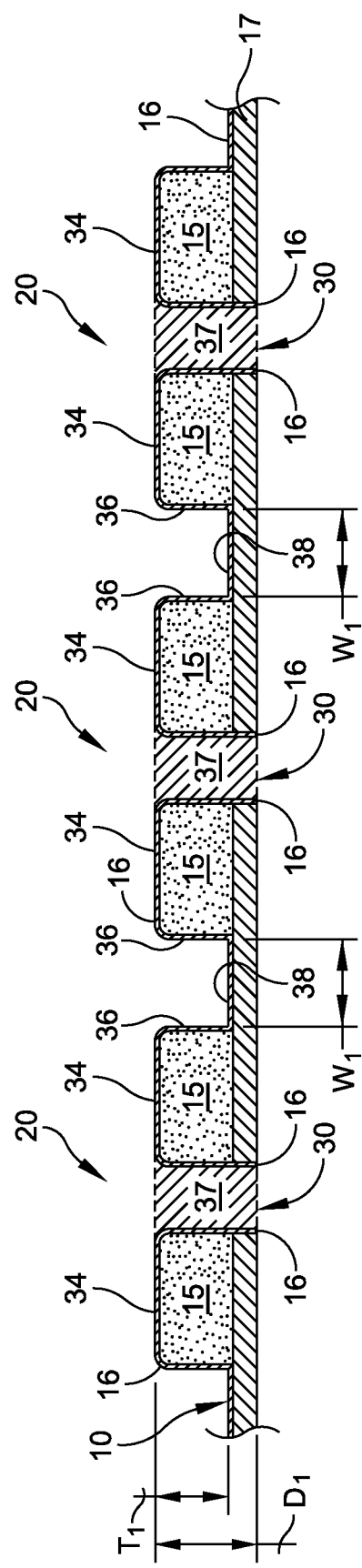
FIG. 7 is a cross-section of a section of the cushioning pad section shown in FIG. 1.

As shown in FIGS. 6 and 7, pad 100 comprises a cushioning layer 15 disposed between optional outer and inner layers 16,17. In the present embodiment, the cushioning layer 15 is disposed between and encapsulated by the optional outer layer 16 and optional and inner layer 17. Outer layer 16 defines the contours of the medallion, defining an upper surface 34 and an exterior sidewall 36 extending downwardly from the upper surface 34 to the upper surface 10 of the channel 38. Similarly, the outer layer 16 defines a vent sidewall 37 extending downwardly from the upper surface 34 to inner layer 17. If desired, the sidewalls 36, 37 may be perpendicular to the upper surface 34, or have an angled profile relative to the upper surface 34. If desired, and as shown, the upper surface 34 may be radiused at the transition region "TR" between the upper surface and the sidewalls 36, 37.

As noted above, the plurality of medallions 20 are spaced apart and interconnected by a plurality of channels 38. For each of discussion, the "channels" will be referred to hereinafter as hinges throughout the description. As shown in FIG. 7, hinges 38 have a width "$W_1$" defined by the spacing between the perimeter of adjacent medallions, a depth "$D_1$" defined by the spacing between the upper surface 34 of the medallions and the upper surface 10 of the pad 100, and a thickness "$T_1$" defined by the combined thicknesses of the inner and outer layers 16,17 and the cushioning material 15 disposed between the layers. The width $W_1$ of the hinges 38 can be varied as desired or needed, and can range from as narrow as about 1 mil to about 1000 mils, or more. In some instances, it can be desirable for the width "$W_1$" of the hinges to be as narrow as possible, in order to maximize the protective features of the medallions, while maintaining the flexibility of the pads. Such applications would include applications in which maximum protection is desired, or in which the hinge is intended to wrap around a corner. Where impact protection is desired, the width of the hinges can be designed to be narrower than the width of the object which would impact the pad. In such instances, the width $W_1$ can range from about 1 mil to about 10 mils, more particularly from about 3 mils to about 7 mils, and more particularly still about 5 mils.

In other instances, in which the protective features are less important, it can be desirable for the width "$W_1$" of the hinges to be much wider, in order to maximize the aesthetic feature of the hinges, which can be made to contrast in color with the medallions. In such instances, the width $W_1$ can be in the millimeter or centimeter range, or even greater, if desired.

The hinges 38 may be linear or curved, depending on the shape of the medallions. The depth of the hinges between the medallions may be the same or different, and the depth may vary along the hinge. Both curved and linear hinges may be used in combination in the pads, as in the present embodiment, and may include a combination of curved and linear hinged areas.

In the present embodiment, the thickness of the cushioning layer 15 disposed between the upper and lower layers 16,17 in hinges 38 may be minimized during the manufacturing process, such that its thickness approaches zero in the hinges 38. As a result, the cushioning material in the hinges 38 may not be visible to the naked eye, or detectable only using very sensitive thickness gauges.

The residual cushioning material 15 remaining in between layers 16,17, if any, assists in bonding layers 16,17 together in the hinges 38. Depending on the materials used, the bonding between layers 16,17 may be at least partially a chemical, thermal and/or mechanical bond. For example, if the material used as the cushioning layer is a resin, the residual resin in the hinges 38 can function as an adhesive to bond layers 16,17 together. Use of the resin as a bonding agent is advantageous, because it eliminates the need for a separate adhesive in the relatively thin hinge areas, and it keeps the bond consistent and equally flexible throughout pad, thereby enhancing the durability of the pad.

Alternatively, if a fabric is used as one of layers 16,17, the bond between the layers in the hinges may be at least partially mechanical, as a result of the resin being squeezed into opening or pores in the fabric, such that portions of layers 16,17 bond during manufacturing, resulting in "islands" of bonded layers 15,16,17 disposed between islands of bonded layers 16,17.

By minimizing or eliminating any residual cushioning material 15 in hinges 38, the flexibility of the hinges is maximized, such that the entire pad 100 is capable of bending, flexing, folding and twisting in a variety of direction.

As noted above, the outer and inner layers 16,17 are optional, but they may be desirable for many reasons, particularly when the cushioning layer 15 is a cellular material, and/or is a material that does not easily retain its shape.

For example, in the embodiments described above, both the outer and inner layers 16,17 are continuously bonded to cushioning layer 15 across the entire pads, including in the hinges. Depending on the construction of the pad, the outer and inner layers may be bonded to cushioning layer 15, or they may be bonded to each other, when the amount of material in the hinges is minimized or eliminated. One advantage of bonding the front layer to cushioning layer 15 is to provide a continuous, uninterrupted surface above and below cushioning layer 15 i.e., to encapsulate cushioning layer 15, other than at the perimeter of the pad. The continuous upper and lower layers strengthen the hinge and groove areas, minimizing breakage in the hinges and/or grooves, which may otherwise occur due to the flexing of the pad during use, because the hinges and/or grooves are thinner than the medallions. At least one bonded layer may be used for the protection of the thin hinge areas during flexing. A thermoplastic polyurethane film, when used as the outer layer 16, is desirable for preventing cracking or breaking of layer 17 in the hinges or grooves. The inner layer can also provide strength to the hinges or grooves if bonded to the foam, or in many embodiments, both inner and outer layers are bonded to the foam. In cases where the hinge thickness is very low, especially with little or no cushioning material in the hinge, both inner and outer bonded layers are desirable to maintain the structural integrity of the pads. It is desirable to use a material with substantial elasticity for the inner and outer layers, such as TPE films, spandex fabrics, and the like. In some embodiments, the use of a fabric with a laminated film backing may be desirable as an inside or outside layer. An inner layer that is a laminate of a fabric and a film, such as a polyurethane film laminate, can be very desirable for maximizing the durability of the hinges.

Optionally, and as disclosed in co-pending and commonly owned U.S. application Ser. No. 13/208,229, filed on Aug. 11, 2011, which is incorporated herein by reference in its entirety, the upper surfaces 34 of the medallions may be contoured using a variety of geometries, including planar surfaces, curved surfaces, and combinations of planar and curved surfaces. Alternatively, the upper surface 34 of a medallion may comprise a surface that is defined by a thickness that generally decreases radially toward the perimeter of the medallion, or toward the perimeter of the pad.

The present pads may be manufactured using techniques disclosed in U.S. Pat. No. 7,827,704 and U.S. Publication Nos. US 2008/0034614 and US 2009/0255625, which are incorporated herein by reference in their entirety. The molds for the present pads are designed to allow layers 15,16,17 to be compressed together under conditions sufficient to minimize or eliminate the foam in the hinges 38,50,60, for certain embodiments of the pads, while allowing the layers to bond together, which may be a chemical, thermal and/or mechanical bond.

Figure 8:
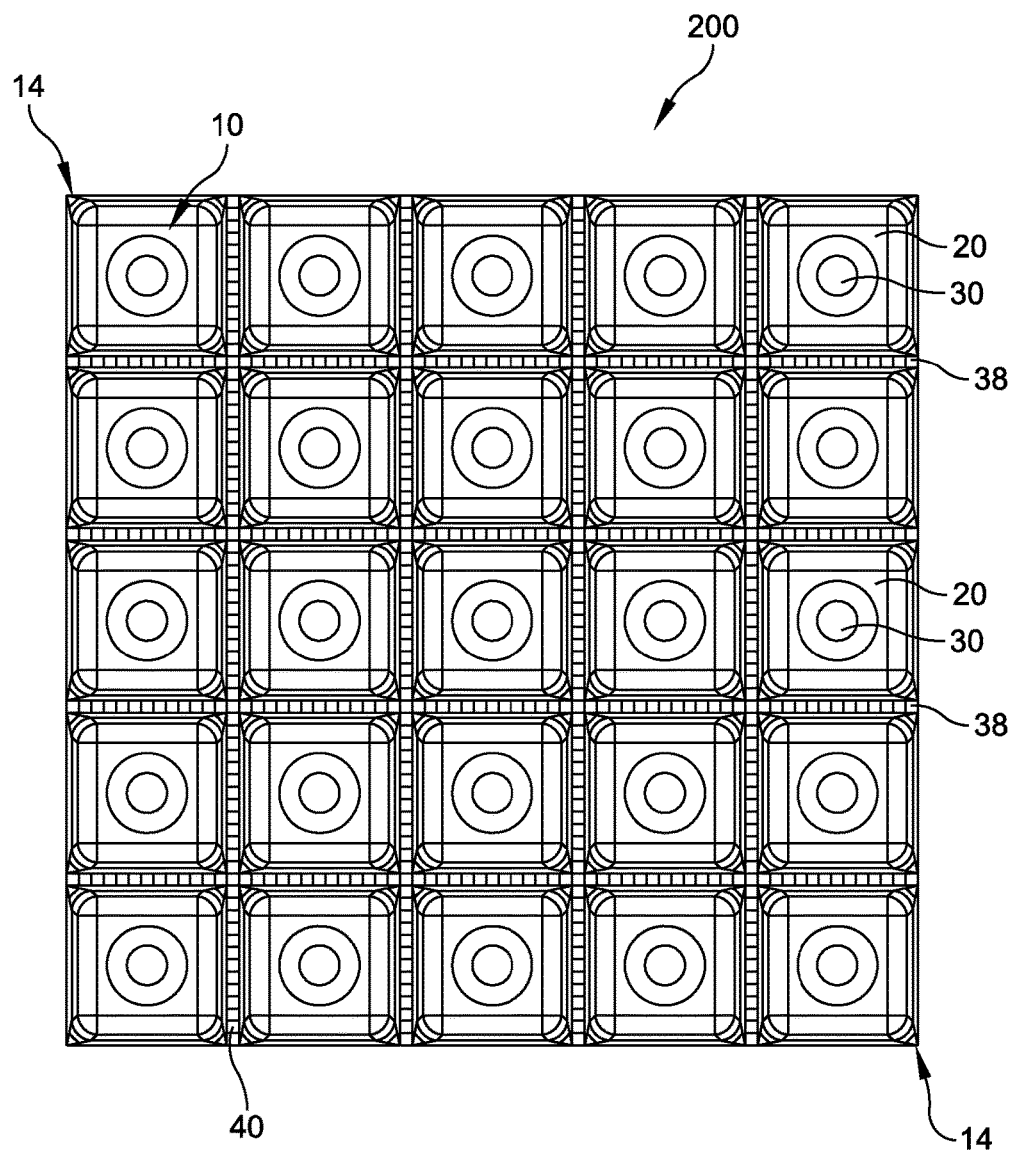
FIG. 8 is a top view of a section of another embodiment of cushioning material according to the present disclosure, which comprises a plurality of vents disposed between the medallions.
Figure 9:
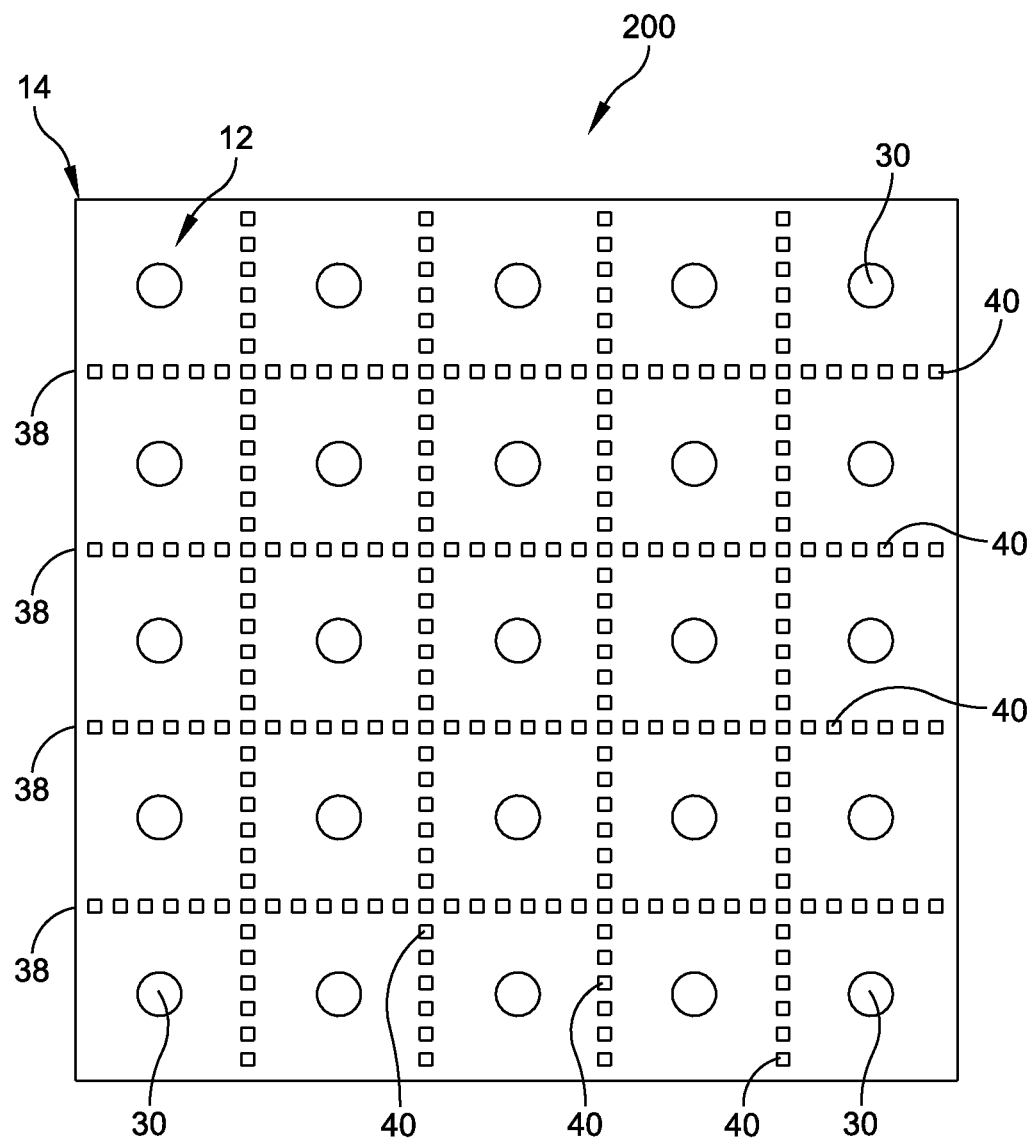
FIG. 9 is a bottom view of the cushioning material section shown in FIG. 8.

FIGS. 8-9, when taken together, illustrate another embodiment of an exemplary cushioning pad 200 according to the present disclosure. Pad 200 has a similar structure to pad 100, with the addition of a plurality of vents 40 (hereinafter referred to as "hinge vents") disposed in the hinges 38 between the medallions 20. The hinge vents are a variation on the medallion vents, and another method to maximize the ventilation of the pad, as well as to decrease the weight of the pad. The hinge vents can be used alone or in addition to the medallion vents 30. In the present embodiment, hinge vents 40 are circular, but as noted above, any size or shape can be used.

Figure 10:
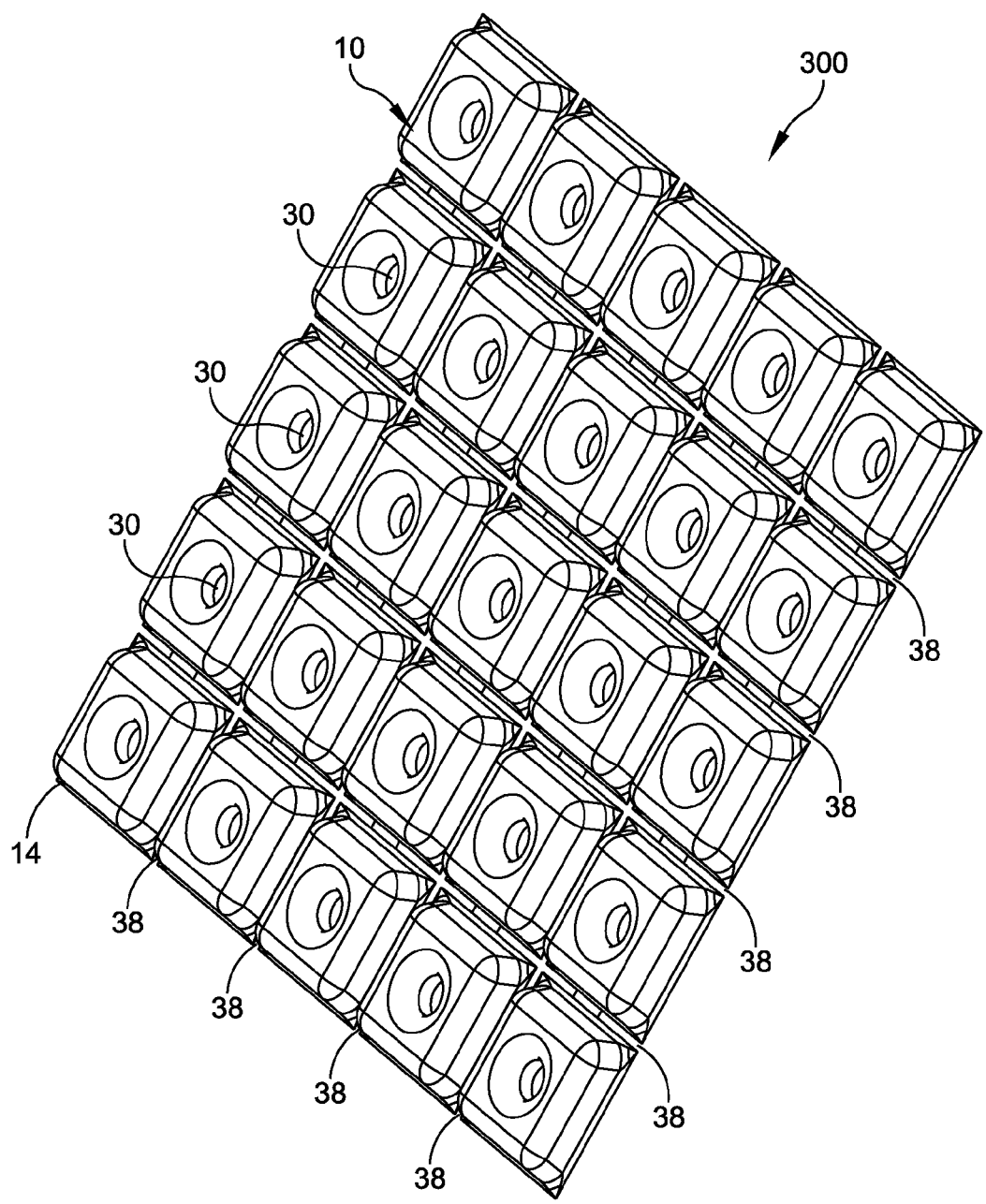
FIG. 10 is a perspective view of a section of another embodiment of cushioning material according to the present disclosure, which comprises a plurality of linear vents disposed between the medallions.
Figure 11:
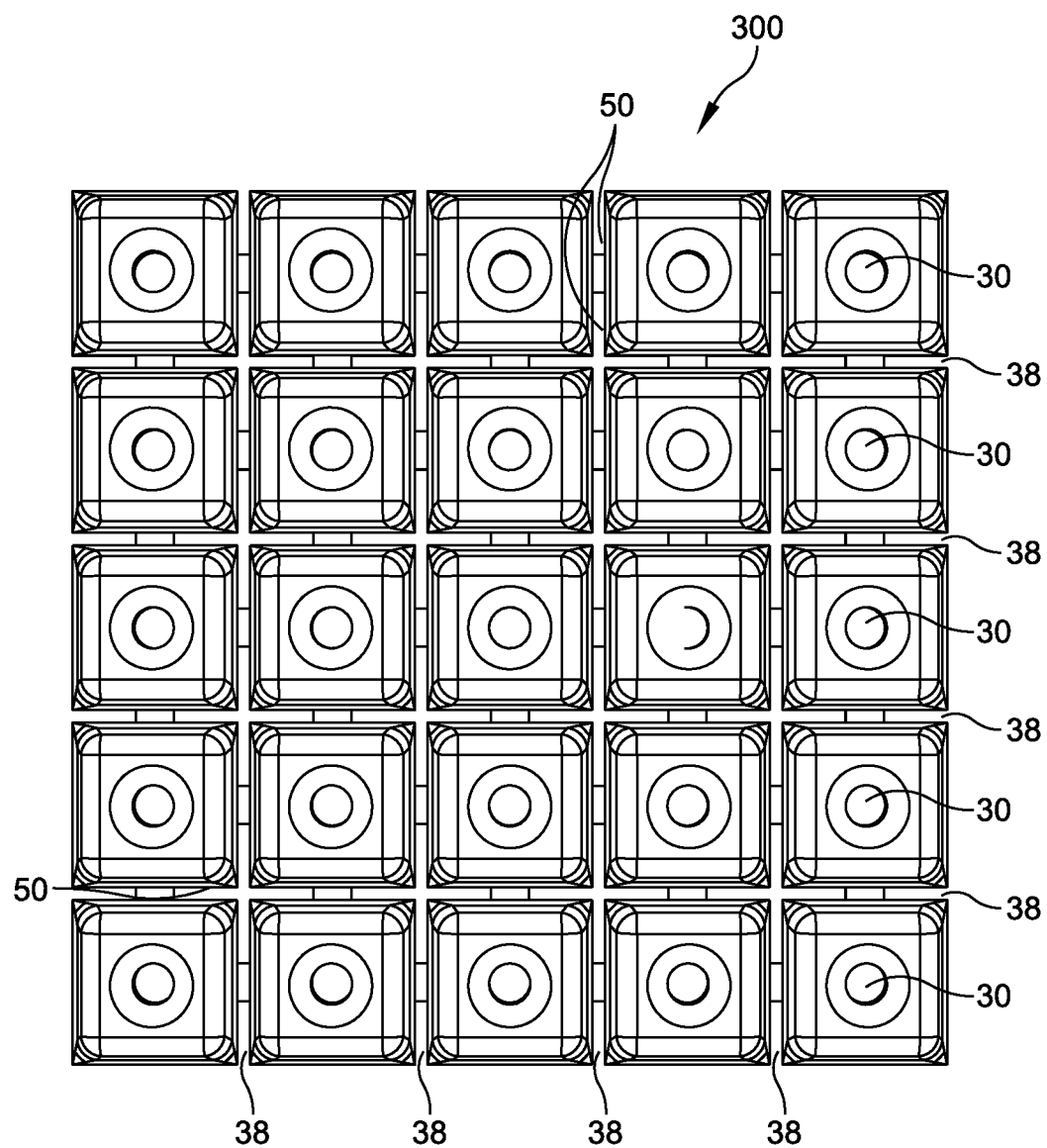
FIG. 11 is a top view of the cushioning material section shown in FIG. 10.
Figure 12:
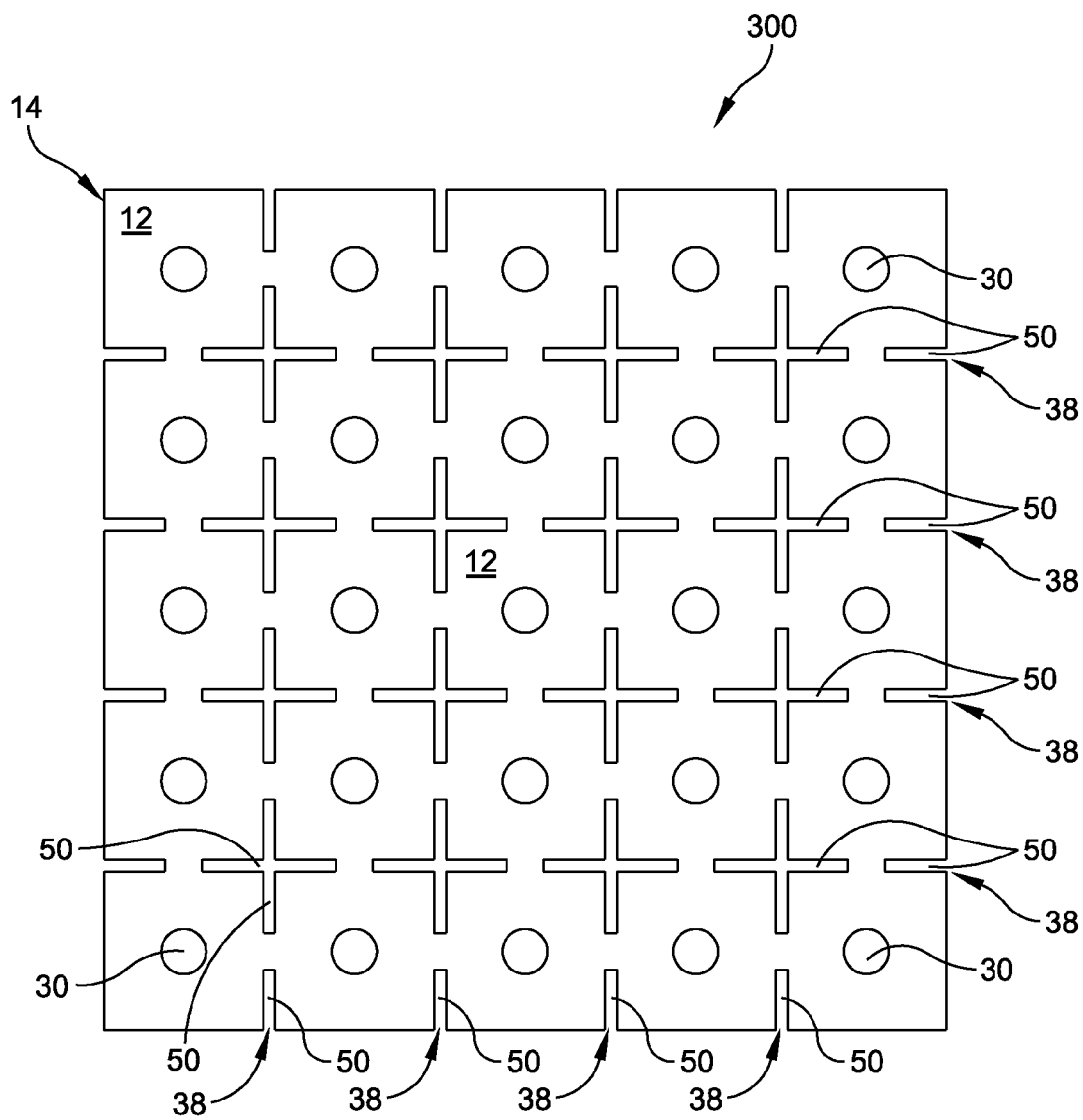
FIG. 12 is a bottom view of the cushioning material section shown in FIG. 10.

FIGS. 10-12, when taken together, illustrate another embodiment of an exemplary cushioning pad 300 according to the present disclosure. Pad 300 has a similar structure to pad 100, with the addition of a plurality of hinge vents 50 disposed in the hinges 38 between the medallions 30. In the present embodiment, hinge vents 50 are linear, but as noted above, any size or shape can be used. Also in the present embodiment, the hinges may be relatively narrow in comparison to other embodiments, which improves the flexibility of the pad, particularly if the pad includes the optional inner and outer layers, and when the inner and/or outer layers are stretchy and/or elasticized.

Figure 13:
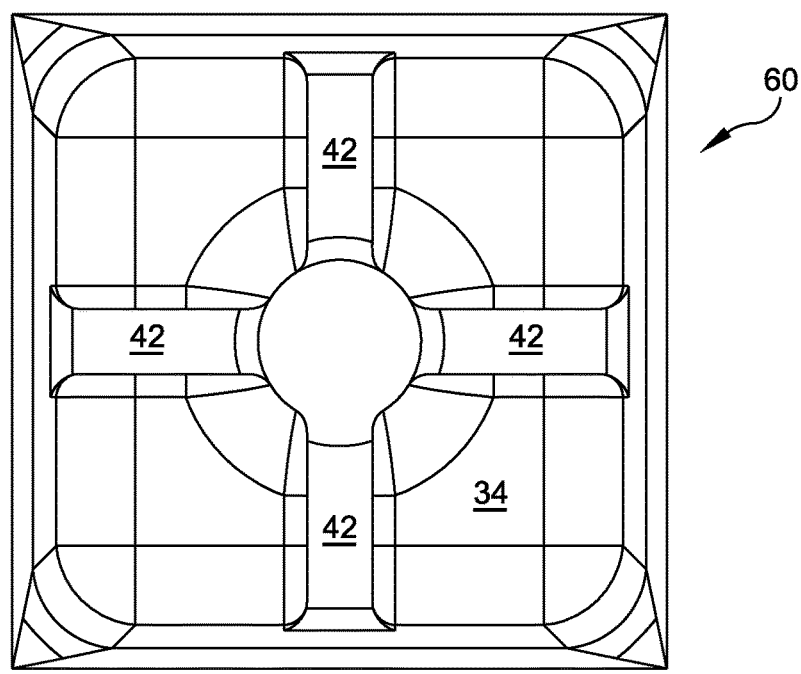
FIG. 13 is a top view of an alternative embodiment of the square cushioning medallion shown in FIG. 4, which includes airflow channels extending from and fluidly connecting the outer sidewalls of the medallion to the vent sidewalls.
Figure 14:
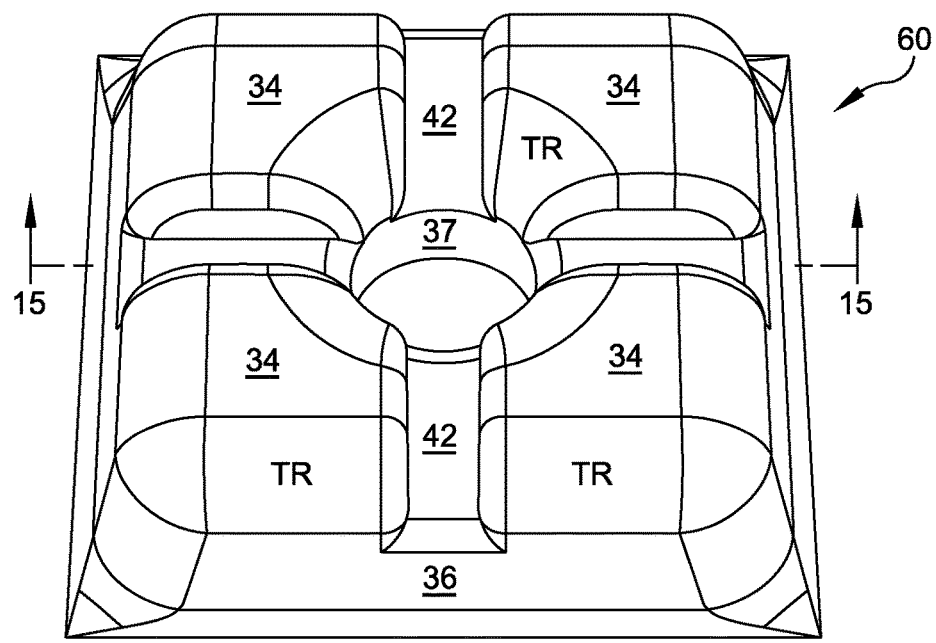
FIG. 14 is a perspective view of the cushioning medallion shown in FIG. 13.
Figure 15:
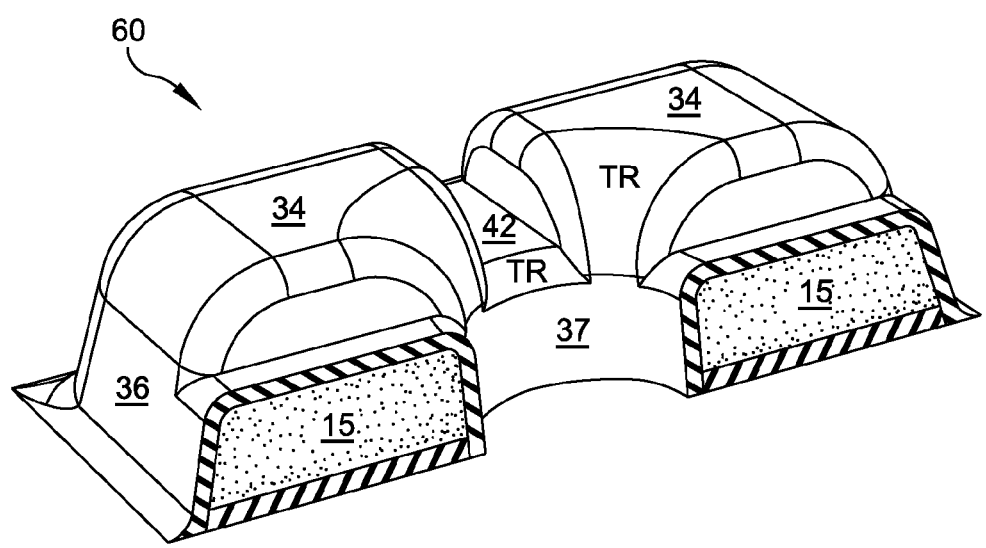
FIG. 15 is a cross-section of the square cushioning medallion shown in FIG. 13.

FIGS. 13-15, when taken together, illustrate another embodiment of an exemplary medallion 60 according to the present disclosure. Medallion 60 has a structure similar to medallion 30, with the addition of a plurality of grooves 42 formed in the upper surface 34 of the medallions, extending from each of the external sidewalls 36 to the vent sidewall 37. The grooves 42 are fluidly connected to the vent, which improves the flow of air to and from the vent 30, as well as decreases the weight of the pad. In addition, like the hinges 38, the grooves 42 increase the flexibility of the pad, and as the thickness of the cushioning layer 15 in the grooves 42 is decreased, the flexibility of the grooves 42, and pad 100, increases, as does the breathability of the pad.

The width, depth, orientation and position of the grooves 42 in the upper surfaces 34 of the medallions may be varied, depending on a number of factors including, but not limited to, the desired direction and amount of flexibility, and the like. However, in order to maximize breathability, fluid connection to the vent is desirable. The width, depth, orientation and position of the grooves 42 may vary, again depending on a number of factors including, but not limited to, the desired amount of bending for the pad and/or medallion in which the groove is formed, the desired breathability of the pads, and the like. The grooves 42 are designed to be thicker than the hinge areas, but thinner than the medallions, at the thickest point of the medallions. Thus, groove thickness can range from about 10 percent (%) to 95% of the medallion thickness, about 20% to about 75% of the medallion thickness, and more particularly still about 50% of the medallion thickness. Also in any pad according to the present disclosure, the grooves 42 are designed allow the pad to bend in targeted areas, and to provide airflow when fluidly connected to the vents.

Like hinges 38, the grooves 42 may be curved grooves, or linear grooves that are disposed along parallel and/or intersecting axes. Both curved and linear grooves may be used in combination, and the grooves may include both curved and linear regions. The thickness of the grooves in a pad or in a medallion may be the same or different, and the thickness may vary along the length of the groove, and from groove to groove.

Figure 16:
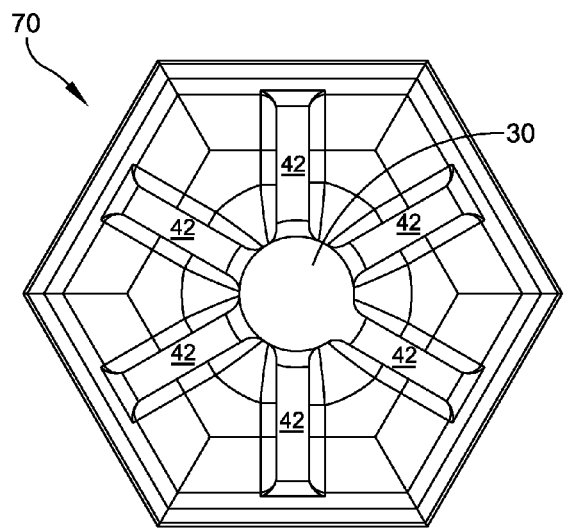
FIG. 16 is a top view of an alternative hexagonal cushioning medallion, which includes a central vent and airflow channels extending from and fluidly connecting the outer sidewalls of the medallion to the vent sidewalls.
Figure 18:
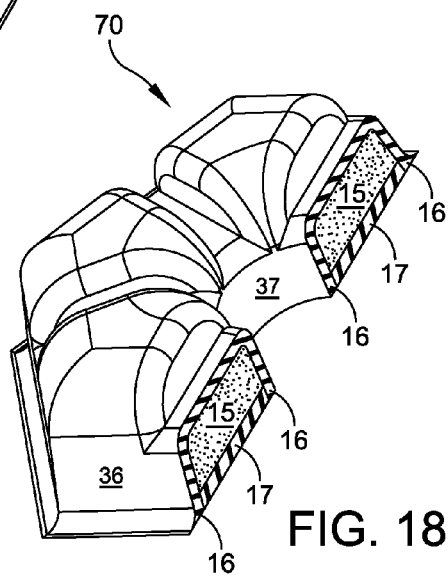
FIG. 18 is a cross-section of the square cushioning medallion shown in FIG. 16.
Figure 17:
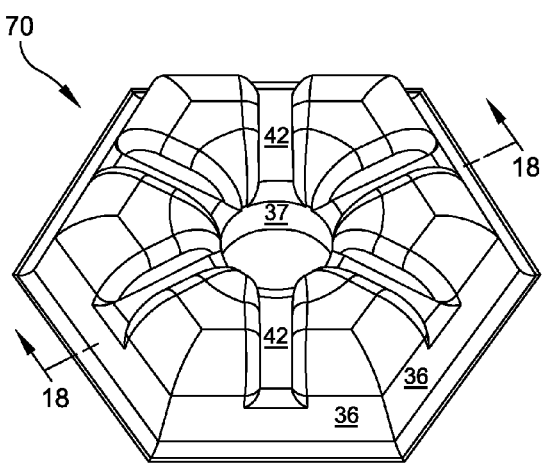
FIG. 17 is a perspective view of the cushioning medallion shown in FIG. 16.

FIGS. 16-18, when taken together, illustrate another embodiment of an exemplary medallion 70 according to the present disclosure. Medallion 70 has a structure similar to that of medallion 60, but with a hexagonal structure, rather than a square structure. Medallion 70 also includes a plurality of grooves 42 formed in the upper surface 34 of the medallions, extending from each of the outer hexagonal sidewalls 36 to the vent sidewall 37.

Figure 19:
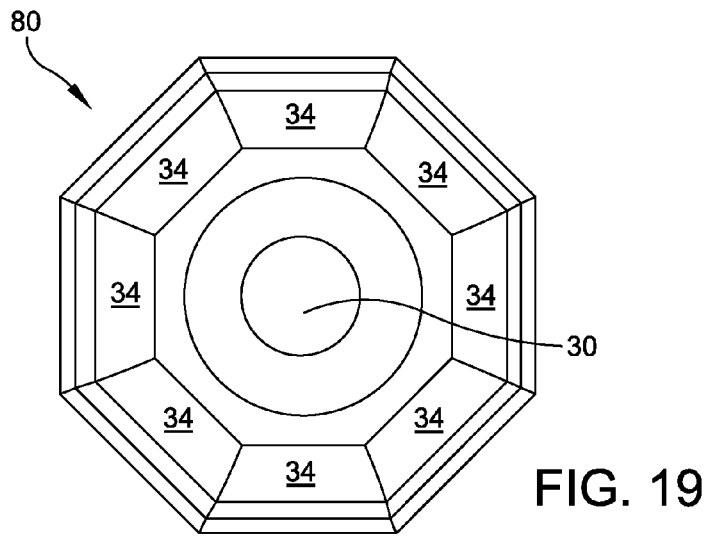
FIG. 19 is a top view of an alternative octagonal cushioning medallion, which includes a central vent.

FIG. 19 illustrates another embodiment of an exemplary medallion 80 according to the present disclosure. Medallion 80 has a structure similar to medallion 30, with an octagonal structure, rather than a square structure.

Figure 20:
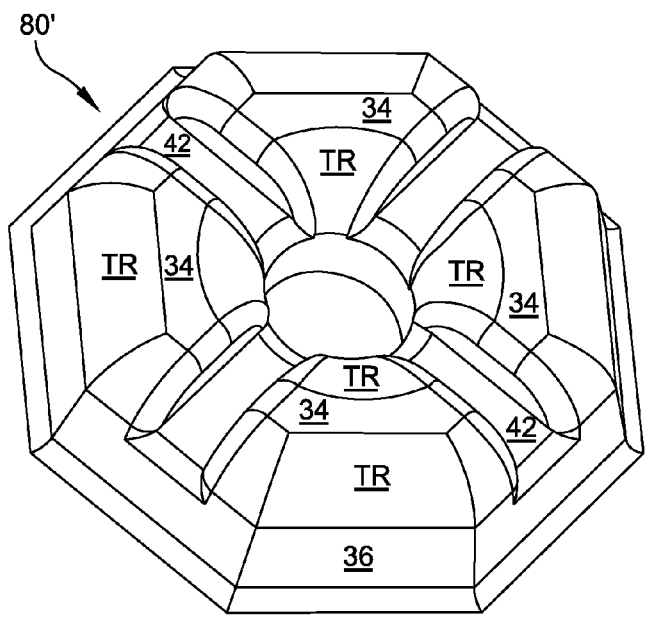
FIG. 20 is a top view of an alternative octagonal cushioning medallion, which includes a central vent and airflow channels extending from and fluidly connecting the outer sidewalls of the medallion to the vent sidewalls.
Figure 21:
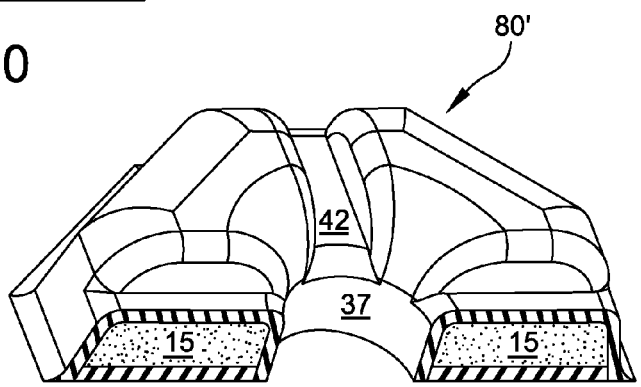
FIG. 21 is a cross-section of the square cushioning medallion shown in FIG. 20.

FIGS. 20-21, when taken together, illustrate another embodiment of an exemplary medallion 80' according to the present disclosure. Medallion 80' has a similar structure to medallions 60,70, with an octagonal structure, rather than a square or octagonal structure. Medallion 80' also includes a plurality of grooves 42 formed in the upper surface 34 of the medallions, extending from each of the outer octagonal sidewalls 36 to the vent sidewall 37.

As described above, another aspect of the present disclosure is the integration of the above-described pad into garments, particularly compression garments, to protect specific areas of the body. When one of the foregoing pads is integrated into a compression sleeve or garment that is tightly fitting to the wearer, the hinged and/or grooved multilayer pad structure is sewn, adhered or otherwise attached to a spandex fabric or otherwise stretchable material in such a way that the hinged pads are held in form fitting contact with the area to be protected. The pad can be sewn to the inside or outside of a garment. It may be desirable to have the pad cover only a portion of the full circumference of the sleeve, so that the sleeve can still stretch to fit the wearer. The integration of the protective pad with the compression garment provides a simple and inexpensive method for adding protection for specific body areas, without altering the entire garment.

When the pad is integrated with a compression sleeve, some unique properties and advantages are provided in comparison to other methods of protecting moving joints. When integrated into a compression sleeve, the pad can be in continuous form fitting contact with the joint to be protected, which may be desirable when protecting flexible joints such as knees, elbows, shoulders and ankles, because the selection of suitable hinges allow the protective sleeves to naturally remain in the correct position and orientation. With a suitable selection of hinges and placement of sleeve on the garment, the protective compression sleeve moves as one with the limb, allowing much wider range of motion than traditional padding.

When the protective sleeve is positioned in form fitting contact with the user's body, the possibility of additional injury to the user by any impact caused by the pad hitting the user is minimized. Stiffer pads may not be capable of form fitting continuous contact with the user's body area or joint, because they are not sufficiently flexible. If not form-fitted, the pads may become part of the impact that injures the wearer. Pads in a sleeve configuration provide improved protection for a moving joint, because they can wrap around a wide radius, and in some instances provide 360 degrees of protection by wrapping the entire joint. In general, it is desirable to leave some area of the compression sleeve without the additional padding layers, to allow the sleeve to stretch and conform to the arm.

In some embodiments, it can be desirable for the garments to be made from a wicking fabric that is designed to move moisture away from the skin layer.

The present pads also may be designed to enhance air and/or moisture transmission, without significantly compromising protection, which may not be an option with other protective padding. The use of vents, as described above, in the hinges, grooves and/or medallions enhances moisture and/or air transmission rates. The use of a spacer fabric or wicking fabric as the inner layer or in combination with a TPE film layer as the inner layer, can enhance comfort as well and wick moisture through the hinges. Also, the use of a high moisture vapor transmissive ("MVT") film layer can further enhance comfort. Such films can function by chemical absorption/desorption. Examples of such films are available under the product name Sympatex, or TX1540 from Omniflex. The use of microporous high MVT films such as Goretex or Porelle (by Porvair) can also be used, or other similar films.

Figure 22:
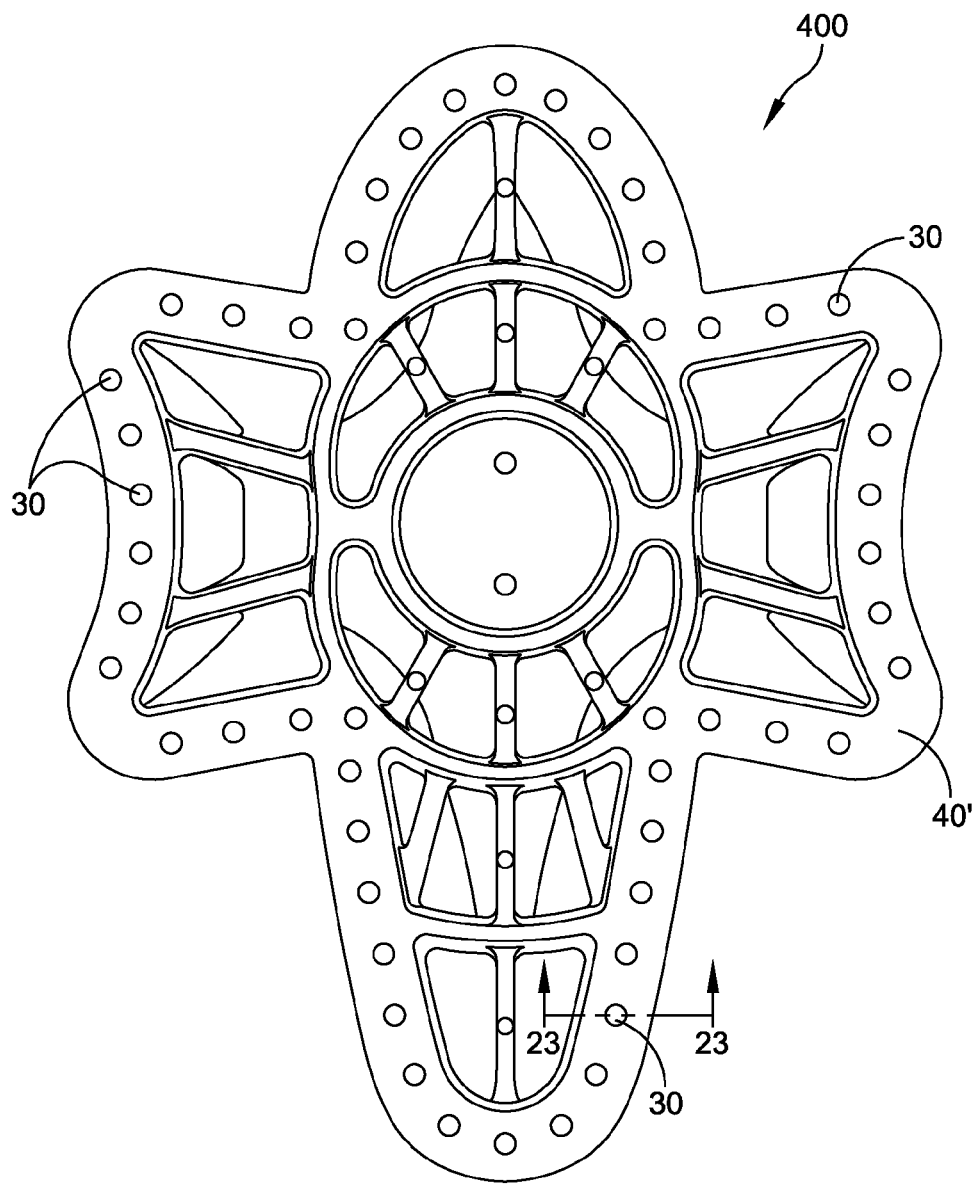
FIGS. 22-23 show top and cross-sectional views of one embodiment of an exemplary elbow pad comprising a plurality of vents extending from and fluidly connecting the front and backsides of the elbow pad.
Figure 23:
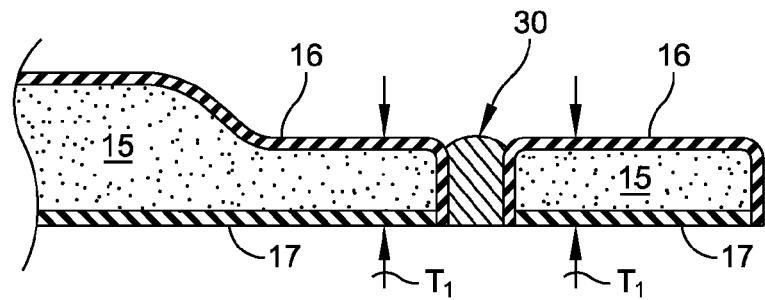

FIGS. 22-23, when taken together, illustrate another embodiment of an exemplary elbow pad 500, which may have the same construction as any of the foregoing embodiments, and an optional flange. In the present embodiment, the pad comprises a plurality of round vents 30, disposed in the channels, grooves and in the flange.

Figure 24:
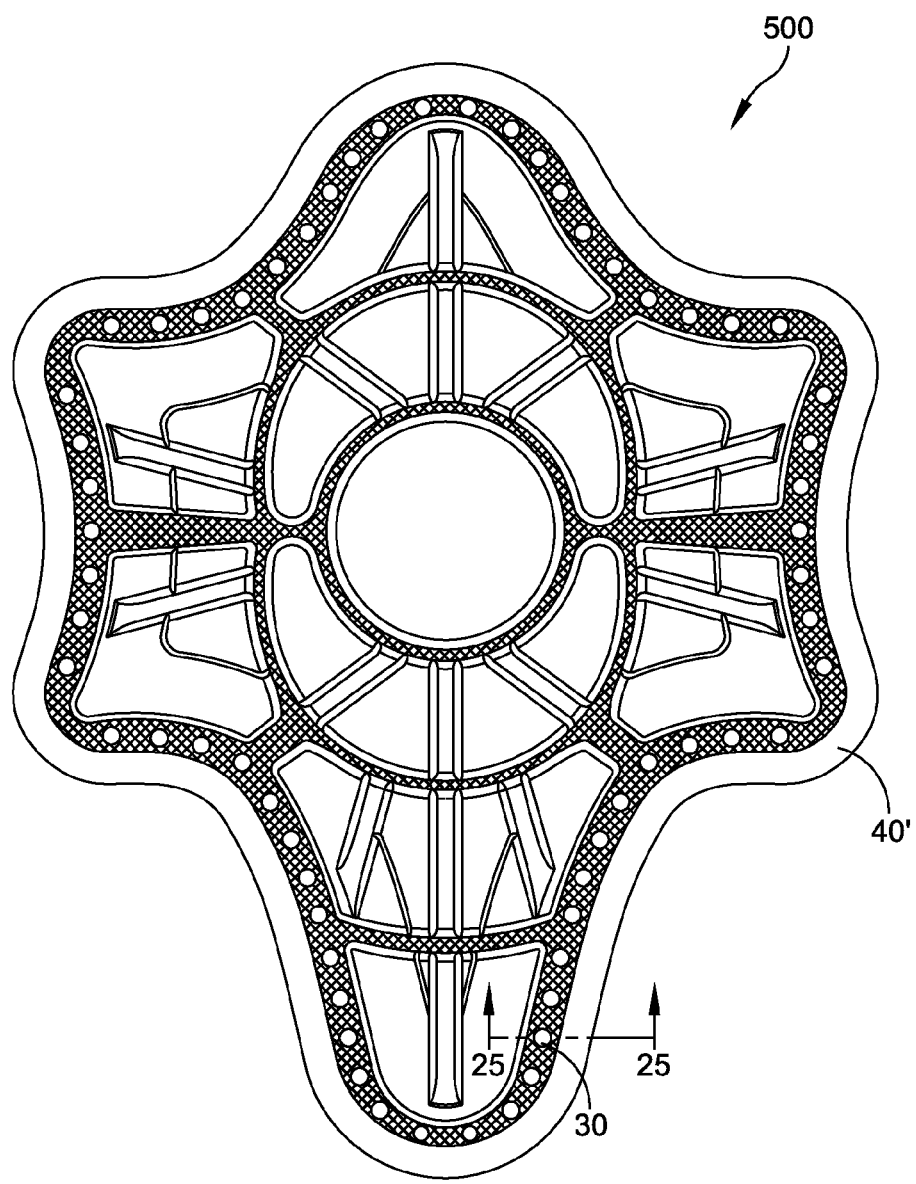
FIGS. 24-25 show top and cross-sectional views of another embodiment of an exemplary elbow pad comprising a plurality of vents extending from and fluidly connecting the front and backsides of the elbow pad.
Figure 25:
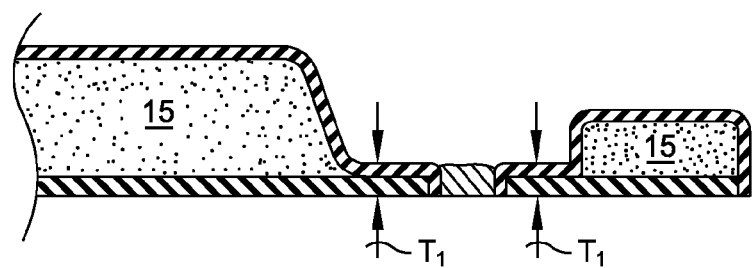

FIGS. 24-25, when taken together, illustrate another embodiment of an exemplary elbow pad 500, which may have the same construction as any of the foregoing embodiments, and an optional flange. In the present embodiment, the pad comprises a plurality of round vents 30, disposed in the channels and in the flange. In the present embodiment, the thickness of the cushioning material in the channels and flange have been minimized or eliminated.

Figure 26:
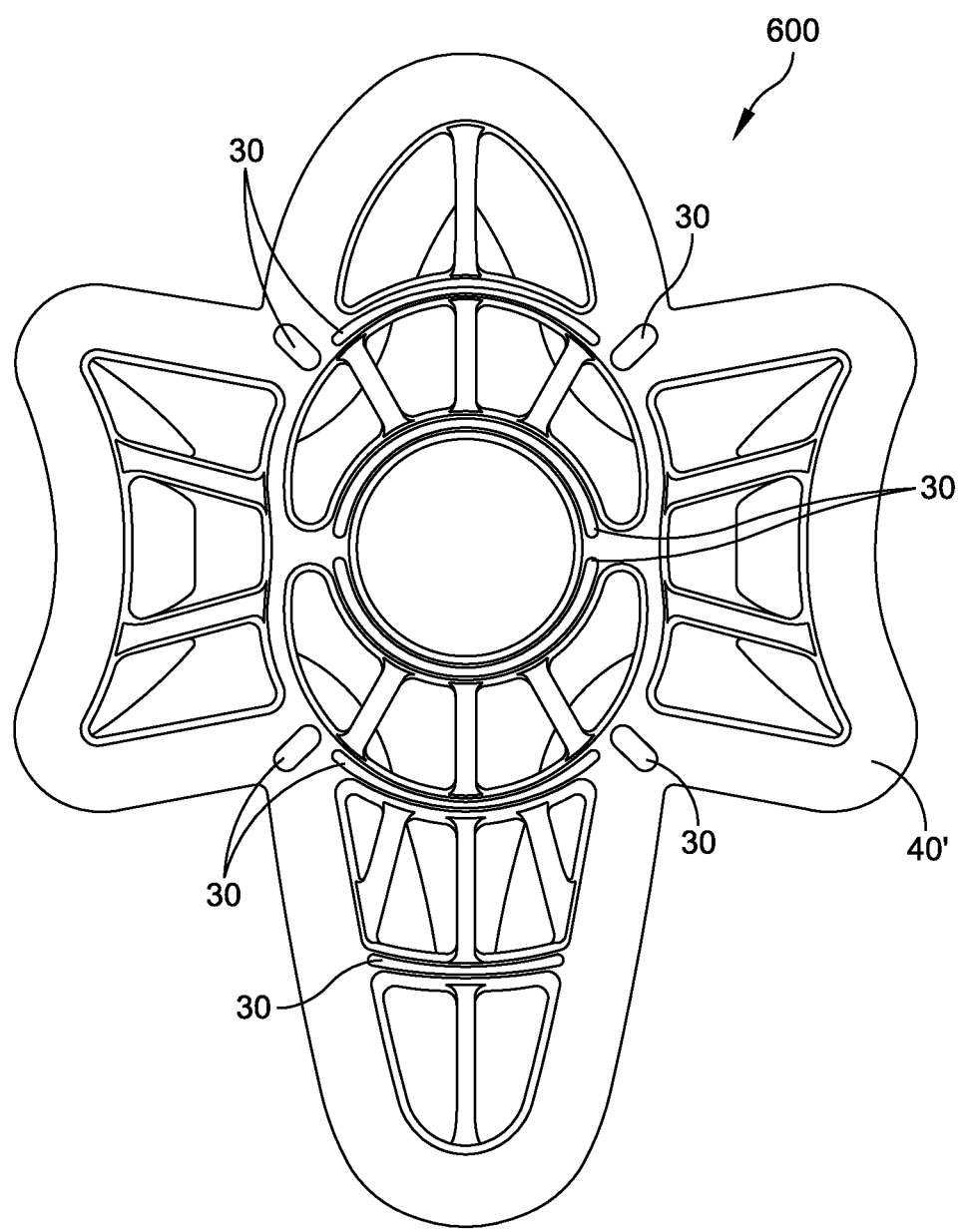
FIG. 26 shows top and cross-sectional views of another embodiment of an exemplary elbow pad comprising a plurality of curvilinear vents extending from and fluidly connecting the front and backsides of the elbow pad.

FIG. 26 illustrates another embodiment of an exemplary elbow pad 600, as disclosed in the '229 application, which also comprises a plurality of curvilinear vents 30. The curvilinear vent shapes shown in the present embodiment provide improved movement and stretch in the curvilinear vented areas, while maintaining the otherwise "encapsulated medallion" structure provided by a bonded multi-layer construction.

In any or all of foregoing embodiments, the pads may comprise an optional perimeter flange 40' (see FIGS. 22-26) defined in the upper surface 10 to maintain the medallions in spaced apart relation from the perimeter of the pad. The optional perimeter flange 40' can comprise a width "$W_2$" defined by the spacing between the perimeter of the outermost medallions and the perimeter 14 of the pads. The width $W_2$ of the perimeter flange 40' may vary, as desired. The perimeter flange 40' can be thinner than the medallions, allowing the pad to be attached to items such as clothing along the flange area using a variety of techniques, such as by sewing, gluing, welding, bonding, heat sealing, and the like. When integrated with, for example, a compression sleeve, the pad can be sewn, glued or otherwise attached to the outside of the sleeve fabric at the flange, or it can be sewn or attached to the interior surface of the sleeve, and exposed through a corresponding opening in the sleeve.

It should be understood that the flange is not necessary to the pads, and that the pads may be attached to an underlying surface using other means, such as by sewing, gluing, welding, heat sealing, bonding, and the like.

In any or all of foregoing embodiments, the cushioning layer 15 can comprise one or more layers of any material or combination of materials having sufficient structural integrity to be formed into predetermined shapes, such as by molding, and that are capable of withstanding the environment in which they are intended to be used, without substantial degradation.

The material type and composition can be selected to provide articles and/or regions of articles with predetermined material characteristics, which can be used to customize the pads for specific applications such as cushioning, impact resistance, wear resistance, and the like. Examples of suitable materials include polymeric materials, composite materials, and the like. Examples of suitable polymeric materials include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials.

In some instances, it may be desirable for the pad to have cushioning characteristics to provide a soft, pliable and comfortable feel such as when used in contact with a body. In such instances, it has been found that some polymeric gels may be suitable. One example of a suitable polymeric gel is a polyurethane gel comprising a durometer ranging from about 0.01 Shore 00 to less than or equal to about 70 Shore A, more particularly less than 70 Shore 00, more particularly still less than 60 Shore 00. The material can comprise a durometer ranging from about 30 Shore 000 to about 88 Shore D. The durometer of the polymer can be determined by those of ordinary skill in the art using tools such as durometers or penetrometers. Formation of the gel can take place by a variety of methods known to those of skill in the art. For example, formation of a polyurethane gel can comprise reacting suitable pre-polymeric precursor materials e.g., reacting a polyol and an isocyanate in the presence of a catalyst.

In some instances, it may be desirable for the pad to be lightweight, and in such instances, the cushioning material 15 may comprise a foam material, such as a low density foam material. Examples of suitable low density foams include polyester and polyether polyurethane foams.

In some instances, it may be desirable for the pad to be capable of providing impact resistance. In such instances, various types of impact absorbing materials have been found suitable for the cushioning material, particularly energy absorbing foams. For such applications, it can be desirable for such foams to have a density ranging from about 5 to about 35 pounds per cubic foot (pcf), more particularly from about 10 to about 30 pcf, and more particularly still from about 15 to about 25 pcf. Suitable rate dependent foams are available from Rogers Corporation under the brand names PORON® and PORON XRD®, which are open cell, microcellular polyurethane foams.

In all of the foregoing embodiments, the optional outer layer 16 can comprise any material capable of providing sufficient elasticity to prevent tearing and/or stretching when a force is applied thereto; sufficient structural integrity to be formed into predetermined shapes; and that is capable of withstanding the environment in which it is intended to be used (e.g., repetitive deformations such as twisting, bending, flexing, stretching, and the like), without substantial degradation. The outer layer 16 also can be selected to facilitate the handling of layer 15, which can comprise adhesive characteristics, in some instances. Therefore, the outer layer 16 can be selected to provide a relatively non-tacky surface and smooth surface to the human touch, after molding.

Outer layer 16 can comprise any thickness, and the thickness can be varied depending upon the application. The desired thickness for a particular application can be determined using routine experimentation by those of ordinary skill in the art. Outer layer 16 can comprise a thickness ranging from about 0.2 milli-inches (hereinafter "mil") to about 60 mils, more particularly from about 0.5 mils to about 30 mils, and more particularly still from about 1.0 mil to about 15 mils.

In instances in which the hand-feel of the products is important, it has been found desirable to minimize the thickness of the outer layer. Therefore, in such products it can be desirable to use the thinnest outer layer possible without sacrificing durability. For example, for applications in which a relatively thin outer layer 16 is desirable, it can comprise a thickness ranging from about 0.2 mil to about 6 mil, more particularly from about 0.5 mil to about 3 mil, and more particularly still from about 0.6 mil to about 2 mil.

In some instances, it can be desirable to use a thicker outer layer 16, which can provide increased durability in comparison to thinner outer layers. For example, when the present materials are used in vibration dampening applications, it can be desirable for the thickness of the outer layer 16 to be about 50 to about 60 mil. Alternatively, thicker layers can be desirable when the cushioning layer is tacky, because the tacky material can be exposed if the outer layer 16 is punctured, making the products difficult to handle.

When the present products are formed using a thermoforming process, it can be desirable to use an outer layer having a thickness of up to about % inch, and even thicker in some instances when desired or necessary. It has been found that it is possible to maintain very soft pliability for outer layers having a thickness of as much as 6 mil or more by applying heat and/or a vacuum during the thermoforming process.

Outer layer 16 also can comprise a support layer (not illustrated), which assists in handling the material. Alternatively, the outer layer may also be applied as a coating of material during or after the molding process, using a variety of techniques known to those of skill in the art.

Suitable materials for the outer layer 16 include plastics, elastomeric materials such as rubber, thermoplastic elastomers ("TPE"), and/or the like, and combinations comprising at least one of the foregoing materials. Examples of plastics that can be used for the outer layer include, but are not limited to, ethylene-vinyl acetate ("EVA"), nylon, polyester, polyethylene, polyolefin, polyurethane, polyvinyl chloride ("PVC"), polystyrenes, polytetrafluoroethylene ("PTFE"), latex rubber, silicone, vinyl, and combinations thereof.

Other possible materials for the outer layer 16 include a variety of other synthetic and/or non-synthetic materials including, but not limited to, paper, fabric, spacer fabrics, metal, metallized plastic, plastic film, metal foil, and/or the like, as well as composites and/or combinations comprising at least one of the foregoing. Other durable materials can be used for the outer layer including knit, woven and nonwoven fabrics, leather, vinyl or any other suitable material. Use of a spacer fabric as the outer layer can maximize the airflow.

It can be desirable to use materials for the outer layer than are somewhat elastic; therefore, stretchy fabrics, such as spandex fabrics, can be desirable. The use of stretch fabric as the outer layer can be desirable because it can improve the flexing of the hinges and grooves, and the forming of the outer layer into a contoured shape. In some cases, heating or otherwise forming or pre-stretching materials with more limited stretch, can improve the final product.

When outer layer 16 comprises a fabric layer, the fabric can be knit, woven, non-woven, synthetic, non-synthetic, and combinations comprising at least one of the foregoing, and the fabric layer can be laminated to, for example, a TPE film. When the pad application requires stretch, then use of an outer layer with elongation may be desirable, and when the outer layer is a laminate, it may be desirable for each layer in the laminate to elongate.

As noted above, it can be desirable to use materials for the outer layer than are somewhat elastic, such as the TPE materials mentioned above. Such TPE materials also can be desirable because they are available as films, in relatively low thicknesses. Any film thickness can be used provided it is compatible with the method of molding and suitable for the intended application, but film thicknesses of between about 1 mil and about 10 mils are desirable. Thicker films are more durable, but thinner films are less expensive, and may provide a softer feel. There are other reasons to choose thicker films, such as when thermoforming deeper shapes, to improve the molding process. The use of a film rather than a fabric as the outside layer can make the product easy to clean and protect the cushioning material from damage and dirt. The films can comprise an elongation of about 100 percent (%) to about 1500%, more particularly about 200% to about 1000%, and more particularly still about 300% to about 700%".

Some possible TPE materials include styrenic block copolymers, polyolefin blends, elastomeric alloys, thermoplastic polyurethanes, thermoplastic copolyester, thermoplastic polyamides, and combinations thereof. Examples of commercially available elastomeric alloys include melt-processable rubbers and thermoplastic vulcanizates. Examples of suitable TPEs include thermoplastic polyurethanes ("TPU"). TPU film can be desirable due to its combination of durability, elasticity, softness and flexibility. One suitable film is a polyester polyurethane film available from Deerfield Urethane, a Bayer Material Science Company, under the product name Dureflex PS5400. It can be desirable to use a polyester TPU film, rather than a polyether TPU film, because the polyester TPU film, in addition to having improved abrasion resistance in comparison to polyether TPU film, also performs unexpectedly well under high humidity conditions, such as in athletic clothing and commercial laundering.

Additionally, pads and garments can be manufactured with both fabric and film on different parts of the pad, allowing for full range of motion and further protection from the use of both materials. It may be desirable that the outer layer be a composite of a fabric and film so that the film aids in protecting the hinge during flexing and can also serve as a protective barrier for the cushioning material.

In any or all of foregoing embodiments, inner layer 17 can comprise the same materials as the outer layer 16. When inner layer 17 comprises a fabric layer, the fabric can be knit, woven, non-woven, synthetic, non-synthetic, and combinations comprising at least one of the foregoing, and the fabric layer can be laminated to, for example, a TPE film. When the pad application requires stretch, then use of an inner layer with elongation may be desirable, and when the inner layer is a laminate, it may be desirable for each layer in the laminate to elongate. Use of a fabric layer as inner layer 17 can be advantageous because it can trap and disperse air bubbles that may otherwise form in or between the layers, resulting in a better appearance for the final molded products.

The use of active agents in one or more of the inner layer, outer layer and/or the cushioning layer can be desirable. For example, the addition of a silver or copper based active agent can provide the material with antimicrobial or antifungal properties. The use of actives in the inner or outer layer or the foam itself can be desirable, such as the addition of silver or copper based actives to act as an antimicrobial or antifungal agent.

One or both of inner and outer layers 16,17 also can comprise color, graphics and/or indicia, including text. The color, graphics and/or indicia disposed on such layers can be transmitted through other layers when they are formed from colorless and/or transparent materials, which can be desirable for aesthetic and costs reasons. In addition, if desired, one or both of inner and outer layers 16,17 also can be fluid-permeable. "Fluid-permeable," as used herein, means that the material from which the layer is formed is open to passage or entrance of a fluid material.

The size, shape, configuration, orientation and dimensions of the pad, medallions, medallion contours, hinges, grooves and flange may be varied as desired in order to achieve the desired characteristics for the pad design. All of the foregoing features, alone or in combination, are designed to facilitate the flexibility of the pad either inwardly or outwardly to conform to a user's body during movement. However, it should be understood that in each of the foregoing embodiments, and in any pad according to the present disclosure, all of the foregoing measurements can vary depending on the desired characteristics and design of the pad. For example, the pads are designed to provide a variety of characteristics such as, but not limited to, cushioning, breathabiltity, ventilation, vibration dampening and/or impact absorption, and the like. The characteristics of the pad may be varied by changing the thickness and/or material type of cushioning layer 15 in the medallions, changing the size, shape, number and position of the vents; changing the spacing between the medallions (i.e., the width of the hinges), and/or changing the contours of the medallions, and the like. For example, using a gel for cushioning layer 15 provides a pad with cushioning and vibration dampening characteristics; using a foam decreases the weight of the pad; using a rate dependent or impact absorbing foam increases the impact absorption of the pad; etc. In general, increasing the thickness of the cushioning layer 15 in the medallions generally increases the foregoing characteristics; and using a combination of materials for cushioning layer 15 may provide a combination of characteristics.

In any or all of foregoing embodiments, and in any pad according to the present disclosure, the hinges are designed provide flexibility to the pad in targeted areas in which flexibility is desired or needed. Using curved, parallel and/or intersecting hinges allows the flexibility of the pad to be tailored to specific functions, such as protecting joints during motion. The width, depth, orientation and position of the hinges may vary, depending on a number of factors including, but not limited to, the desired amount and location of flexibility for the pad.

The flexibility of the hinges can be varied, by varying the thickness of the material in the hinge regions. For example, decreasing the thickness of the material in the hinges increases the flexibility of the pad, and increasing the thickness of the material in the hinge regions decreases the flexibility. In some embodiments that include one or both of the inner and outer layers 16,17, it is possible to "squeeze" the cushioning layer 15 in the hinges to minimize or eliminate the amount of material in the hinge region. In such embodiments, the flexibility can be maximized or improved by minimizing the thickness of the cushioning layer 15 in the hinges, or when the pad is molded without cushioning layer 15 in the hinges 38. For example, when using inner and outer layers 16,17 with thicknesses of about 4 mils, it is possible to achieve hinge thicknesses approaching 8 mils, or approaching the combined thickness of the inner and outer layers 16,17, by removing as much cushioning material 15 from the hinge area, as is possible during the molding process.

To maximize flexibility in laminated structures, it is desirable to use a hinge depth of less than about 20% of the medallion thickness, more particularly less than about 10% of the medallion thickness, and more particularly still less than about 5% of the medallion thickness. Successful parts have been made with hinge depths of 0.020", 0.040" and up to 0.080".

When the pads are molded with an optional inner and/or outer layer, or both layers, the maximum pad flexibility may be achieved when the hinge thickness approximately corresponds to the combined thickness of the layer(s) other than layer 15, or when the thickness of the cushioning layer 15 is minimized and approaches zero.

Deep hinges can also have some foam thickness, and still provide great mobility. As noted below, one feature of the present protective pads is that the outer and/or inner layers can protect the cushioning layer from breaking at the relatively thin hinge regions during repetitive flexing, so the foam thickness is not limited by the foam flex strength, as long as the foam is bonded to either or both inner and outer layers.

In each of the foregoing embodiments, and in any pad according to the present disclosure, the width of the hinges, or spacing between the medallions, is designed allow the pad to bend as much as possible, while still retaining the protective characteristics of the medallions. Therefore, the spacing between the medallions can be determined by the amount of distance needed to have a flexible hinge, without exposing too much space between the medallions, such that injuries would occur when the gap between the medallions is impacted. Thus, maximum protection may be achieved using a hinge width of less than about 20% of the medallion thickness, more particularly less than about 10% of the medallion thickness, and more particularly still less than about 5% of the medallion thickness. As noted above, the use of angled or saw-toothed shaped hinges and/or grooves (not illustrated) can also reduce the amount of exposed unprotected surface.

In any or all of foregoing embodiments, the pads may be formed such that the foam has a generally uniform density throughout the pad. Specifically, in some instances it may be desirable to minimize compress the foam in the grooves or hinges during molding or forming, because the compression increases the density of the foam, which tends to reduce the range of motion and provide non-uniform padding levels by eliminating foam. The contoured medallions and variations in foam thickness not only provide an aesthetically pleasing pad, but they also provide the ability to maximize protection where it is most needed, and reduce protection where it is needed less. By using uniform foam density and varying thickness where needed, the weight of the pad is reduced, and the range of motion is increased. Using thermoforming or compression to take foam and compress areas to shape may increase density in those areas and create additional weight, uneven protection and less range of motion.

The present cushioning materials provide advantages over other materials. The present vented cushioning materials can be used to make breathable, low profile, conformable protective padding and clothing for athletes. Such pads and clothing are breathable, allowing the transpiration of sweat and air. In addition, in some embodiments, the individual cells of the padding can move independently of one another.

Padding and garments made from the present vented cushioning material are washable, durable and have improved breathability in comparison to such padding without venting. In addition, the protective capability of the present padding is increased in comparison to comparable structures that do not include vents, because the vented medallions and padding may absorb more energy, due to the ability of the walls to move, as well as to collapse. When rate dependent materials are used to form the padding, the vented construction provides increased area for shock or energy transmission to the rate dependent material.

The pad construction, when inner and outer film layers are used in the pad, allows the manufacturer to reduce the width of the spacing between the cushioning regions, because it is not necessary to use fabric to locate and position the pad. This also allows the manufacturer to angle and design the shape of these grooves and hinges to cover and protect the user during the complete range of movement while stretching, fitting, and remaining in place during the activity.

The ability to create an exposed or exoskeletal protective pad, in contrast to a pad enclosed in a pocket, offers advantages for individuals wearing supportive or corrective braces, such as knee braces, ankle supports, back supports, and the like. Thus, the pads can be attached or adhered to mechanical supports to protect adaptive mobility athletes from themselves and from other athletes with similar braces. Similarly, the design of pads according to the present disclosure can be customized and adhered to braces worn by conventional athletes. This provides protection to both the wearer of the brace but also other athletes who come in contact with the corrective brace. One example of such a brace is the padding on knee braces used in professional football.

The present pads can also be used on shin guards worn by youth, adult and professional soccer players. The properties of impact absorbing foam padding in combination with form fitting garments provides unique and highly accurate protection of targeted body parts. Therefore, one embodiment of this disclosure is flexible, form-fitting breathable shin and ankle guards for soccer players. Such shin and ankle guards provide more protection to soccer players due to the closer fit of the foam, more comfort from the wicking materials, venting and perforation used in construction, and a more durable product than, for example, non-breathable, hard plastic pad held in place with straps, or friction of the user's sock.

The foam padding and other layers as noted earlier can be designed with perforations either throughout the material, or within the groove or hinge areas, with minimal or no deterioration of the impact protection. The fact that all layers of the pad are continuously bonded together, in some embodiments, allows the transpiration of water vapor through the pre-established pathways rather than absorption into the pad. Once the moisture is wicked into the fabric layer, it can be channeled out through the pads because the surfaces are bonded. In contrast, other pads may have one or more of the layers free floating, making them more uncomfortable to wear.

In certain embodiments, the fact that the outside surface (fabric or film) is (in some embodiments) the actual outside surface of the garment or sleeve is an important distinction. Pads that have unbonded fabric or other covering sewn across the outside, covering the padding, allow slippage of the outer layer across the padding on impact, which affects the precision of the impact protection. When wearing the current garments according to the present disclosure, the wearer has the pad on the exterior of a form-fitted garment, which provides more accurate protection of the specific body area or joint. Having the exposed outer layer of the present disclosure pad as the outside layer of the garment or sleeve (as shown in FIGS. 12 and 13), also allows improved moisture or air flow management, which is improved to cut foam pieces with any form of loose cover. Precision vents and air channels minimize heat and moisture build-up. In addition, embodiments with the outside surface of the pad exposed allow for the inside of a form fitting garment to lie flat against the user's skin, as the inside surface of the pad can generally be flat. When attached to the outside of an elastic fabric, the user can have an uninterrupted layer of elastic fabric or other material against the skin. This allows the pad to closely hug the skin surface, and also to have a more seam-free interior surface which is less likely to cause abrasions or irritations to the skin.

Use of the pads exposed on the surface also provides improved ability to make hinges or grooves tighter and/or smaller because an add-on external material could otherwise block flexing by filling in the hinge spaces and interfering with the movement of the hinges. The grooves and hinges can also be angled and shaped in specific designs to cover and protect the subject more precisely. The creation of specific and more aerodynamic shapes can also be made on the garment surface using the present pads. The aerodynamic surface, combined with protection, can be an advantage in sports such as ski racing, in which the wearer would be protected, for example from impacts with gates, while having enhanced lower wind resistance. Other sports can benefit from improved aerodynamics, such as bike racing.

Use of the present impact absorbing pads, when exposed on the surface of a garment, allows the impact absorbing foam to react faster, because it eliminates layer(s) between the pad and impact. This can be a desirable feature when using "rate dependent" impact absorbing foams, such as Poron XRD, or other such materials that stiffen on impact, and the use on the exposed surface with only a single layer of bonded film or other material between foam, and the object impacting the pad allows the foams to react better and more quickly.

In some embodiments, the use of film, particularly polyester polyurethane film, as the outside layer of a pad attached to a sleeve or garment, creates a durable and more washable pad system. The exterior surface, with the film exposed, can be both durable and dirt resistant. Fabric as a top layer, whether sewn or otherwise attached, can rip and tear or get dirty, can be difficult to clean. Fabric and/or film that is continuously bonded as an inner or outer layer, either together in the hinge areas, or to the cushioning material in the medallions, is more durable than unbonded sewn fabric used in many pads, in which a torn outer garment exposes the pad meant to protect the wearer, and subjects it to dislocation or removal from the garment. In the embodiments of the present disclosure that use a fabric layer as the inner or outer layer, a film layer inside the fabric can also minimize and/or prevent dirt or liquid from infiltrating or penetrating the foam.

The fact that the pads in many embodiments are molded with uniform density of foam padding (i.e., not higher density compressed foam) allows more precise design of the protection, and greater range of motion than varied densities caused by compression.

The present pads, clothing and methods of manufacture are advantageous for many reasons. For example, a single continuous pad with many elements provides an economic advantage over traditional pad construction techniques, by eliminating labor-intensive cutting, scoring or thermoforming that may otherwise be required for end garment construction.

Some embodiments have hinge areas near zero while others are at 0.010" (10 mils), 0.020" (20 mils) or even 0.080" (80 mils) or 0.120" (120 mils).

The use of a bonded inner layer with elasticity and a bonded outer layer with elasticity is also desirable in embodiments where stretch is desired, such as when the cushioning pad is attached to a stretch garment.

Where near the thickness of the hinge areas approaches zero, or in thin hinge areas (less than 0.100" (1 mil) foam), the fact that the entire pad has a continuously bonded inner or outer layer (or both) maintains spacing and prevents separation of an unprotected area. This is in contrast to pads in which separate cut pieces are used to create the pad, because the cut pieces can separate under stress or force and allow the user to be exposed, and possibly injured.

In some embodiments, the use of narrow hinge spacing has proved desirable to prevent exposed areas when the joint is flexed in certain ways. The present disclosure allows very narrow hinges, or very narrow spacing between medallions, and minimizes the danger of the hinge separating during use.

The present pads can be manufactured to provide better protection to specific body areas while being lightweight, which is a significant advantage to athletes and active individuals.

One advantage of the present protective pads is that an entire flexing region can be protected by one pad or several pads designed specifically for a certain part of the body, rather than smaller cut pads or strips that are sewn into a garment. The continuously bonded large pad is both more economical, and also prevents shifting of the cut or strips of pads that would cause gaps in protection. In addition to providing improved and more accurate protection than current products, the present protective pads allow the entire durable pad to be exposed, which can be both an aesthetic advantage and weight savings, and can make the pad more comfortable with better moisture or air transmission.

Those of ordinary skill in the art will recognize that other methods of attachment may be used, but it has been found that sewing provides certain advantages. In contrast to heat sealing or welding, it has been found that sewing the cushioning pads in place along the perimeter flange prevents or minimizes the pads from separating from the garment, which is advantageous in comparison to pads that are loose within the garment (i.e., held loosely in pockets designed to contain the pads), or that are attached by sewing, gluing, welding, heat sealing, and the like.

The foregoing pads are exceptionally durable, and can withstand repeated commercial laundering. In such pads, when incorporated into garments, it is theorized that the thickness of the perimeter flange (e.g., about 20 mils) provides a sturdier region for stitching, which would otherwise would fray and rip without the cushioning material if unsupported by the 20 mil perimeter flange. Moreover, the perimeter flange makes a more attractive product, with a softer edge than is possible by terminating with the film at the perimeter of the cushioning pad.

It is also thought that the near-zero hinges throughout the pad allow the pad contribute to the durability of the pad during the washing cycle, because the foam material in the hinges is so thin, that a cellular structure no longer exists. Thus, the stitched perimeter flange prevents or minimizes the pad from lifting off in repeated washing, i.e., locking down the perimeter of the cushioning pad.

In addition, the continuous bonding of the inner and outer films either to the cushioning material in the medallion regions, or to each other in the hinges, prevents or minimizes the chance of fluid or other materials from getting into the pad, and of the cushioning material from escaping from the pads. In combination, both features enhance the durability of the many pads in rigorous conditions, eliminating or preventing completely the delamination of layers, as occurs in other products. It is thought that the perimeter flange and adjacent near zero hinge prevent or minimize fluid and/or particulates from infiltrating the pads beyond the perimeter flange, because the foam has been removed almost completely from the hinge area, and without the cellular structure of the foam in the hinge area, fluid and/or particulates cannot migrate past the perimeter flange. Therefore, the perimeter hinge acts as a buffer to the infiltration of fluid and/or particulates into the pad.

Similarly, the "network" of hinges throughout the cushioning pads, particularly when the hinges are "near zero" hinges, further improves the durability of the pads, because eliminating and/or minimizing the foam, or other cushioning material in the hinge area, increases the bond strength in the hinges. The bond strength is increased in the hinge area because the remaining cushioning material in the hinge areas is insufficient to support the foam structure (in the case of a foam). If foam remains in the hinges, the bond strength may be limited to the foam tear strength. Thus, when the thickness of the foam or other cushioning material, is minimized, the bond in the hinges increases, because there are no thin foam cell walls to tear. That is, without a cellular foam structure in the hinges, there is no space for fluid and/or particulate penetration beyond the perimeter flange. As a result, if a single medallion or hinge is damaged or compromised, damage to the entire pad is minimized or compartmentalized, because the damage may extend only to the adjacent pad and/or hinge.

Another advantage of the present pads is that the combination of deep hinges and less deep grooves, or multi-level hinging, provides a protective garment with improved protection, while maintaining a significant range of motion in the protected area. The use of connected top, bottom or both layers allows for the more precise use of the hinges and grooves, and keeps the individual medallions from moving relative to one another. In addition, the integration with stretchable form-fitting garment material results in significant wrapping of the protected area and keeps the exterior pad in continuous contact with the specific area of the body.

It should be noted that the terms "first," "second," and the like herein do not denote any order or importance, but rather are used to distinguish one element from another, and the terms "a" and "an" herein do not denote a limitation of quantity, but rather denote the presence of at least one of the referenced items. Similarly, it is noted that the terms "bottom" and "top" are used herein, unless otherwise noted, merely for convenience of description, and are not limited to any one position or spatial orientation. In addition, the modifier "about" used in connection with a quantity is inclusive of the stated value and has the meaning dictated by the context (e.g., includes the degree of error associated with measurement of the particular quantity).

Compounds are described herein using standard nomenclature. For example, any position not substituted by an indicated group is understood to have its valency filled by a bond as indicated, or a hydrogen atom A dash ("-") that is not between two letters or symbols is used to indicate a point of attachment for a substituent. For example, —CHO is attached through the carbon of the carbonyl group. Unless defined otherwise herein, all percentages herein mean weight percent ("wt. %"). Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.). The notation "+/−10%" means that the indicated measurement may be from an amount that is minus 10% to an amount that is plus 10% of the stated value.

Finally, unless defined otherwise, technical and scientific terms used herein have the same meaning as is commonly understood by one of skill in the art to which this disclosure belongs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A breathable cushioning pad, comprising:
   a cushioning region pad comprising an upper layer with a surface, a lower layer with a lower surface, and a cushioning material disposed between the upper layer and the lower layer, the cushioning pad comprising a thickness;

a first channel disposed in the cushioning pad and defining a cushioning region having a thickness, the first channel comprising a thickness less than the thickness of the cushioning region; and at least one vent comprising a sidewall extending through and in fluid connection with the upper surface and the lower surface.

2. The breathable cushioning pad of claim 1, further comprising a groove defined in the upper surface of the cushioning region, the groove comprising a thickness less than the thickness of the cushioning region and greater than the thickness of the first channel.

3. The breathable cushioning pad of claim 1, further comprising a flange and a second channel adjacent to the flange, the flange having a thickness greater than the thickness of the second channel and less than the thickness of the cushioning region.

4. The breathable cushioning pad of claim 1, wherein the pad further comprises at least one vent extending through and in fluid connection with the upper surface and the lower surface of the pad.

5. The breathable cushioning pad of claim 4, wherein the at least one vent is disposed in the first channel.

6. A breathable cushioning pad, comprising:

a cushioning region comprising an upper surface, a lower surface, a thickness and a width, the cushioning region comprising a cushioning material disposed between and continuously bonded to a continuous upper layer and a continuous lower layer;

a channel disposed around and defining the cushioning region, the channel comprising a thickness less than the thickness of the cushioning region, the channel further comprising the continuous upper layer and the continuous lower layer, the continuous upper layer at least partially bonded to the continuous lower layer; and at least one vent extending through and in fluid connection with the upper surface and the lower surface;

further comprising a perimeter flange and a perimeter channel, the perimeter flange spaced apart from the cushioning region by the width of the perimeter channel, the perimeter flange having a thickness greater than the thickness of the perimeter channel and less than the thickness of the cushioning region.

7. The breathable cushioning pad of claim 6, further comprising at least one vent extending through and in fluid connection with the upper surface and the lower surface of the channel.

8. The breathable cushioning pad of claim 6, further comprising a groove defined in the upper surface of the cushioning region, the groove comprising a thickness less than the thickness of the cushioning region and greater than the thickness of the channel.

9. The breathable cushioning pad of claim 6, wherein the perimeter channel further comprises at least one vent extending through and in fluid connection with the upper surface and the lower surface of the perimeter channel.

* * * * *